(12) United States Patent
Maida

(10) Patent No.: US 6,469,746 B1
(45) Date of Patent: Oct. 22, 2002

(54) MULTI-VISION SCREEN ADAPTER

(75) Inventor: Yoshiaki Maida, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 08/174,686

(22) Filed: Dec. 28, 1993

(30) Foreign Application Priority Data

Dec. 28, 1992 (JP) .............................. 4-348138
Dec. 28, 1992 (JP) .............................. 4-348140

(51) Int. Cl.$^7$ .................... H04N 5/445; H04N 9/74
(52) U.S. Cl. ................ 348/564; 348/565; 348/588; 348/153
(58) Field of Search ................ 348/564, 565, 348/588, 153, 159, 383; H04N 5/445, 9/74

(56) References Cited

U.S. PATENT DOCUMENTS

| | | | | | |
|---|---|---|---|---|---|
| 4,450,579 A | * | 5/1984 | Nakashimi | .................. | 382/8 |
| 4,589,029 A | * | 5/1986 | Torimaru et al. | .......... | 348/333 |
| 4,630,110 A | * | 12/1986 | Cotton | ........................ | 358/108 |
| 4,673,974 A | * | 6/1987 | Ito | ............................. | 358/108 |
| 4,775,886 A | * | 10/1988 | Hirosawa | .................... | 358/256 |
| 4,800,376 A | * | 1/1989 | Suga | .......................... | 340/721 |
| 4,931,872 A | * | 6/1990 | Stoddard et al. | ............ | 348/588 |
| 5,040,067 A | * | 8/1991 | Yamazaki | .................... | 348/588 |
| 5,047,858 A | * | 9/1991 | Aimonoya | ................... | 348/564 |
| 5,142,367 A | * | 8/1992 | Hong | ......................... | 348/564 |
| 5,146,335 A | * | 9/1992 | Kim et al. | ................... | 348/564 |
| 5,161,012 A | * | 11/1992 | Choi | .......................... | 358/183 |
| 5,172,234 A | * | 12/1992 | Arita | .......................... | 358/224 |
| 5,506,628 A | * | 4/1996 | Chun | ......................... | 348/588 |

FOREIGN PATENT DOCUMENTS

| | | |
|---|---|---|
| JP | 61-75691 | 4/1986 |
| JP | 62-65582 | 3/1987 |
| JP | 02061792 | 3/1990 |
| JP | 2-274074 | 11/1990 |
| JP | 03138596 | 6/1991 |
| JP | 03245298 | 10/1991 |

* cited by examiner

*Primary Examiner*—Andrew Faile
*Assistant Examiner*—Vivek Srivastava
(74) *Attorney, Agent, or Firm*—Armstrong, Westerman, Hattori, McLeland & Naughton

(57) ABSTRACT

The present invention discloses a multi-vision screen display device which has a plurality of processing units each assigned to a subscreen of a display screen. The processing unit processes to display an input image on a display area which is the subscreen assigned to itself. Such processing unit comprises an image memory, a display magnification selecting unit for selecting a read-out area of the input image to be displayed on the display area, a writing unit for writing an image signal within the read-out area into the image memory at a pixel density which corresponds to a display magnification, and a reading unit for reading the image signal from the image memory at a timing which realizes to display the read-out area of the input image on the display area.

24 Claims, 13 Drawing Sheets

MULTI-VISION SCREEN ADAPTER

BACKGROUND OF THE INVENTION (1) Field of the Invention

The present invention relates to a multi-vision screen adapter for combining a plurality of images inputted with a corresponding number of monitoring cameras and displaying the composite image on a multi-vision screen divided into a number of subscreens corresponding to the number of the input images.

(2) Description of Related Art

Generally a multi-vision screen adapter operates PIP (Picture in Picture) system (display system capable of displaying a plurality of images simultaneously on a screen) whereby input images from several monitoring locations (commonly two or four, in some cases sixteen locations) are composed into one image, and the composite image is displayed on a multi-vision screen. In this PIP system, a plurality of locations can be monitored simultaneously simply by examining the composite image. With the PIP system, however, details in the input image cannot be examined unless it is magnified and displayed over the screen. Displaying of the input image over the whole screen makes it impossible for the operator to examine other monitoring locations concurrently, even though one monitoring location can be examined thoroughly. As a result, discovery of an unusual happening will be delayed unless it happens in front of the monitoring camera currently displayed on the screen.

SUMMARY OF THE INVENTION

Accordingly, it is a first object of the present invention to provide a multi-vision screen adapter for displaying a plurality of input images from a corresponding number of monitors simultaneously on a multi-vision screen by zoom-up magnifying any of the input images.

It is a second object of the present invention to provide a multi-vision screen adapter for zoom-up automatically detecting an unusual happening in the input image.

It is a third object of the present invention to provide a multi-vision screen adapter for zoom-up magnifying the input image when an unusual happening is detected therein.

It is a fourth object of the present invention to provide a multi-vision screen adapter of high practicability for applying zoom-up magnification, one time magnification, which is defined here as reproduction at actual size, PAN/TILT, STEP SHIFT to each subscreen of the multi-vision screen independently.

The above objects may be fulfilled by a multi-vision screen display device comprising a display screen divided into areas for displaying a plurality of input images on the areas, an image processing unit in the same number as said areas, each for receiving the input image and outputting the input image at a timing which realizes to display it on the preset area, an input image distributing unit for distributing the input images each to the preset image processing unit, and a display control unit for controlling the image processing unit to zoom-up the input image to be displayed on the desired area.

The image processing unit may be comprised of an image memory, a writing unit for writing the input image into the image memory, a reading unit for reading the image from the image memory at a timing which realizes to display the image on the preset area, and the display control unit may control a writing speed of the writing unit and a reading speed of the reading unit at the image processing unit which is designated to operate the zoom-up of the image.

The display control unit may further comprise a readout area selecting unit for selecting a size of a readout area within a scanning field of the input image, in which the readout area represents the image to be read from the scanning field and displayed on the preset area of the display screen.

The display control unit may further comprise a readout area displacing unit for displacing the readout area within the scanning field in a horizontal scanning direction and/or a vertical scanning direction at a fixed speed.

The display control unit may further be comprised of a readout area replacing unit for dividing the scanning field into a plurality of subfields and replacing the subfield with another at a lapse of time, thereby the readout area is selected on the replacing subfield.

The above objects may be fulfilled by a multi-vision screen display device having a same number of processing units as subscreens of a display screen, the processing units processing to display an input image on a display area being the subscreen assigned to each processing unit, the processing unit comprising an image memory, a display magnification selecting unit for selecting a read-out area of the input image to be displayed on the display area, a writing unit for writing an image signal within the selected read-out area into the image memory at a pixel density which corresponds to a display magnification, and a reading unit for reading the image signal from the image memory at a timing which realizes to display the read-out area of the input image on the display area.

The writing unit may comprise a coordinate detecting, unit for detecting coordinates of the image signal within a scanning field at each moment, a judging unit for judging if the detected coordinates place within the read-out area of the input image, a clock frequency changing unit for changing a frequency of a sampling clock in accordance with the display magnification, a sampling unit for sampling the image signal at the frequency of the sampling clock, a horizontal address designating unit for designating a horizontal address where the image signal is written in, a vertical address designating unit for designating a vertical address where the image signal is written in, and a write controlling unit for writing the image signal sampled by the sampling unit into a write-in area of the image memory designated by the horizontal address and the vertical address when the judging unit judges that the coordinates of the image signal place within the read-out area of the input image.

The sampling unit may be an A/D converter.

The multi-vision screen display device may further comprise a unit for generating a pixel clock basing upon the inputted image signal, wherein the clock frequency changing unit is comprised of at least one divider and a switch, and it can change the display magnification at least into a zoom-up display or a one-time magnification display by having the switch select a pixel clock as the sampling clock at the zoom-up display or having the same select a division of the pixel clock by the divider as the sampling clock at the one-time magnification display.

The horizontal address designating unit may be a first counter which counts the sampling clock while the vertical address designating unit may be a second counter which counts a horizontal synchronous signal included in the image signal, in which the first counter is reset when a horizontal component of the coordinates represents a right end of the read-out area while the second counter is reset when a vertical component of the coordinates indicates a top end of the read-out area, the coordinates detected by the coordinate detecting unit.

The coordinate detecting unit may be comprised of an X coordinate counter and a Y coordinate counter, the X coordinate counter counting the pixel clock until the coordinate detecting unit is reset by the horizontal synchronous signal included in the image signal while the Y coordinate counter counting the horizontal synchronous signal until the coordinate detecting unit is reset by the vertical synchronous signal.

The display magnification selecting unit may be comprised of an output circuit for outputting coordinates of an upper left corner and a bottom right corner of the read-out area represented by the counting number of the X coordinate counter and the counting number of the Y coordinate counter.

The judging unit may be a comparator which compares the counting number of the X coordinate counter and the counting number of the Y coordinator with the coordinates from the output circuit.

The output circuit may comprise an X start register and a Y start register for holding the X coordinate of the start point and the Y coordinate of the start point respectively, the start point indicating the upper left corner of the read-out area, while an X end register and a Y end register for holding the X coordinate of the end point and the Y coordinate of the end point respectively, the end poind indicating the bottom right corner of the read-out area.

The multi-vision screen display device may further comprise a read-out area horizontal displacing unit for updating the X coordinates in the X start and the X end registers with keeping a same difference between them.

The read-out area horizontal displacing unit may be comprised of a read-out area positive displacement controlling unit for updating the X coordinates in the X start and the X end registers by increasing them at a fixed speed, a first comparator for comparing the updated X coordinate in the X end register with the right end, coordinate of read-out area of the input image at said increase of the X coordinates, a read-out area negative displacement controlling unit for updating the X coordinates in the X start and the X end registers by decreasing them at a fixed speed, a second comparator for comparing the updated X coordinate in the X start register with the left end coordinate of the read-out area of the input image at said decrease of the X coordinates, and the read-out area horizontal displacing unit may start operating the read-out area positive displacement controller when the X coordinate in the X start register coincides with the left end coordinate of the read-out area.

The multi-vision screen display device may further comprise a read-out area vertical displacing unit for updating the Y coordinates in the Y start and the Y end registers with keeping a same difference between them.

The read-out area vertical displacing unit may be comprised of a read-out area positive displacement controlling unit for updating the Y coordinates in the Y start and the Y end registers by increasing them at a fixed speed, a first comparator for comparing the updated Y coordinate in the Y end register with the top end coordinate of the read-out area of the input image at said increase of the Y coordinates, a read-out area negative displacement controlling unit for updating the Y coordinates in the Y start and the Y end registers by decreasing them at a fixed speed, a second comparator for comparing the updated Y coordinate in the Y start register with the bottom end coordinate of the read-out area at said decrease of the Y coordinates, and the read-out area vertical displacing unit may start operating the read-out area positive displacement controlling unit when the Y coordinate in the Y start register coincides with the bottom end coordinate of the read-out area.

The input image may be shot by a monitoring camera and a screen of the monitoring camera may be divided into a plurality of areas, and the output circuit may include a circuit for replacing the coordinates of the start point and the end point of the read-out area on one area, the coordinates held in the X start register, the Y start register, the X end register, and the Y end register, with the coordinates of the start and the end points of the read-out are on another area.

The multi-vision screen display device may further include an image sensor for computing a sum of a luminance signal of a pixel placing within a fixed range of the read-out area, and generating an alarm signal when a difference between the sum at a last scanning field and the sum at a current scanning field is larger than a predetermined threshold value.

The image sensor may be comprised of an adding unit for adding the luminance signal of every pixel within the fixed range of the read-out area at the current scanning field, a holding unit for holding said addition result for the sum at the last scanning field, a difference computing unit for computing the difference between the addition result held in the holding unit and the addition result from the adding unit; and an alarm signal output circuit for comparing the difference from the difference computing unit with the threshold value, then outputting the alarm signal when the difference is larger than the threshold value.

The multi-vision screen display device may further comprise a zoom-up display selection controlling unit for selecting the zoom-up display upon receipt of the alarm signal from the image sensor, a writing unit for writing an image signal within the selected read-out area into the image memory at a pixel density which corresponds to a display magnification, and a reading unit for reading the image signal from the image memory at a timing which realizes to display the read-out area of the input image on the display area.

The multi-vision screen display device may further comprise a connection switching unit placing between the monitoring camera and each processing unit and for replacing a connection between the monitoring camera and the processing unit with another.

The above objects may be fulfilled by a multi-vision screen display device which processes an input image from a plurality of monitoring cameras by a same number of processing units as the monitoring cameras and displaying each input images on a subscreen of a multi-vision screen simultaneously, the processing units comprising an image memory, and a display magnification selection unit for selecting a read-out area within a scanning area of a screen at the monitoring camera, the read-out area to be displayed on a display area being the subscreen assigned to the processing unit, a writing unit for writing an image signal within the read-out area into the image memory at a pixel density which corresponds to a display magnification, and a reading unit for reading the image signal from the image memory at a timing which realizes to display the, read-out area of the input image on the display area.

The multi-vision screen display device may further comprise a read-out area replacing unit for replacing the read-out area by another and a connection switching unit for replacing a connection between the monitoring camera and the processing unit by another, wherein the read-out area is determined in accordance with the connection by the connection switching unit which determines the number of the processing units where the monitoring camera provides the input image.

The writing unit may comprise a coordinate detecting unit for detecting coordinates of the image signal within a scanning field at each moment, a judging unit for judging if the detected coordinates place within the read-out area of the input image, a clock frequency changing unit for changing a frequency of a sampling clock in accordance with the display magnification, a sampling unit for sampling the image signal at the frequency of the sampling clock, a horizontal address designating unit for designating a horizontal address where the image signal is written in, a vertical address designating unit for designating a vertical address where the image signal is written in, and a write controlling unit for writing the image signal sampled by the sampling unit into a write-in area of the image memory designated by the horizontal address and the vertical address when the judging unit judges that the coordinates of the image signal place within the read-out area of the input image.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Embodiment 1

Figure 1:
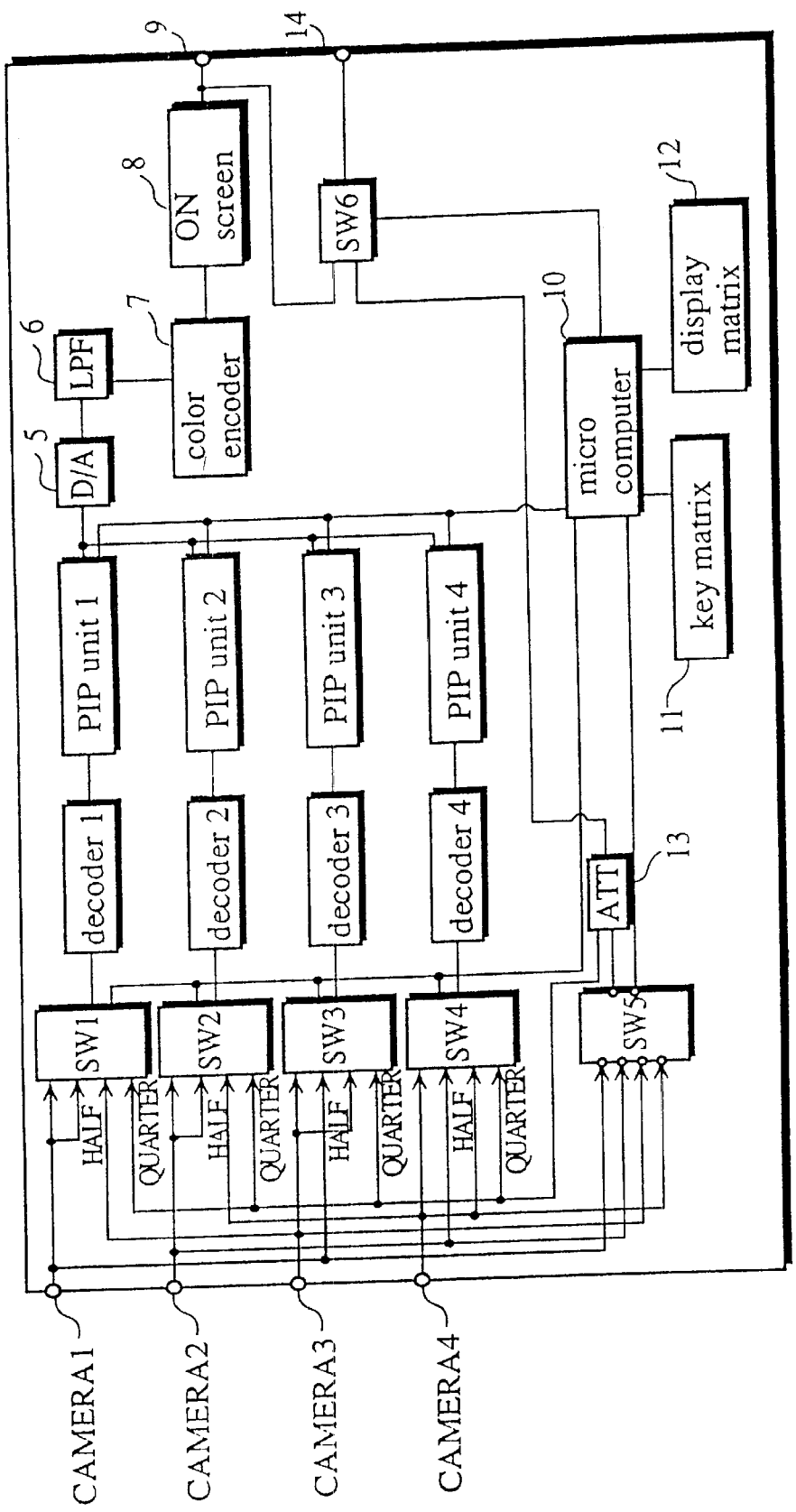
FIG. 1 is a block diagram showing a circuit of a multi-vision screen adapter in an embodiment.

An embodiment of the present invention will be described hereunder with reference to figures. FIG. 1 shows circuit construction of a multi-vision screen adapter. Image signals from four monitoring cameras (not illustrated) are inputted to monitor input terminals of the multi-vision screen adapter. Acceptance or rejection of each image signal by the input terminal is controlled by a microcomputer 10 which controls ON/OFF of switches SW1–4. The colors of the accepted image signals are decoded by corresponding decoders 1–4, and the accepted image signals are inputted to corresponding PIP units 1–4. The PIP units 1–4 transform each input signal based upon a preset magnification, and outputs the transformed signal from a four-vision output terminal 9 via a D/A converter 5, an LPF (Low-Pass Filter) 6, a color encoder 7, and an on-screen 8 (character insertion device).

The microcomputer 10 controls ON/OFF of switches SWs 5 and 6 besides the switches SW1–SW4. Further, the microcomputer 10 controls the PIP units 1–4, a key matrix 11, and a display matrix 12.

It is assumed that each of the switches SW1–SW4 has four ON positions, p1, p2, p3, and p4. The position p1 is turned on when a reduced image signal from each input terminal is displayed on a quarter of the four-vision screen (QUAD OUT). The position p2 (HALF in the figure) is turned on when slightly reduced image signals from the input terminals 1 and 2 are displayed on a left and right half of the vertically (possibly horizontally) divided two-vision screen respectively (HALF OUT). The position p3 (HALF in the figure) is turned on when slightly reduced image signals from the input terminals 3 and 4 are displayed on a left and a right half of the vertically divided two-vision screen respectively (HALF OUT). The position p4 is turned on when image signals from each of input terminals 1–4 are partially displayed at actual size in a quarter of the four-vision screen by the switch SW5.

The switch SW 5 is directed by the microcomputer 10 to select one of the image signals from the input terminals 1–4. Subsequently, the selected signal is inputted to the input position p4 (QUARTER in the figure) of each switches SW1–3 and SW6 via an ATT 13 (attenuator). Directed by the microcomputer 10, the switch SW 6 outputs through a video output terminal 14 either a first image signal from the switch SW 5 or said four image signals (QUAD OUT) from the on-screen 8.

Construction of the PIP units 1–4 will be described as with reference to FIG. 2. In the figure each of the PIP units 1–4 has an image memory 21, a writing circuit 22 for writing an original image from a monitoring camera into the image memory 21, a readout circuit 23 for reading out the original image from the image memory 21, and a circuit 24 for decoding an instruction from the microcomputer 10 into logic signals.

Figure 3:
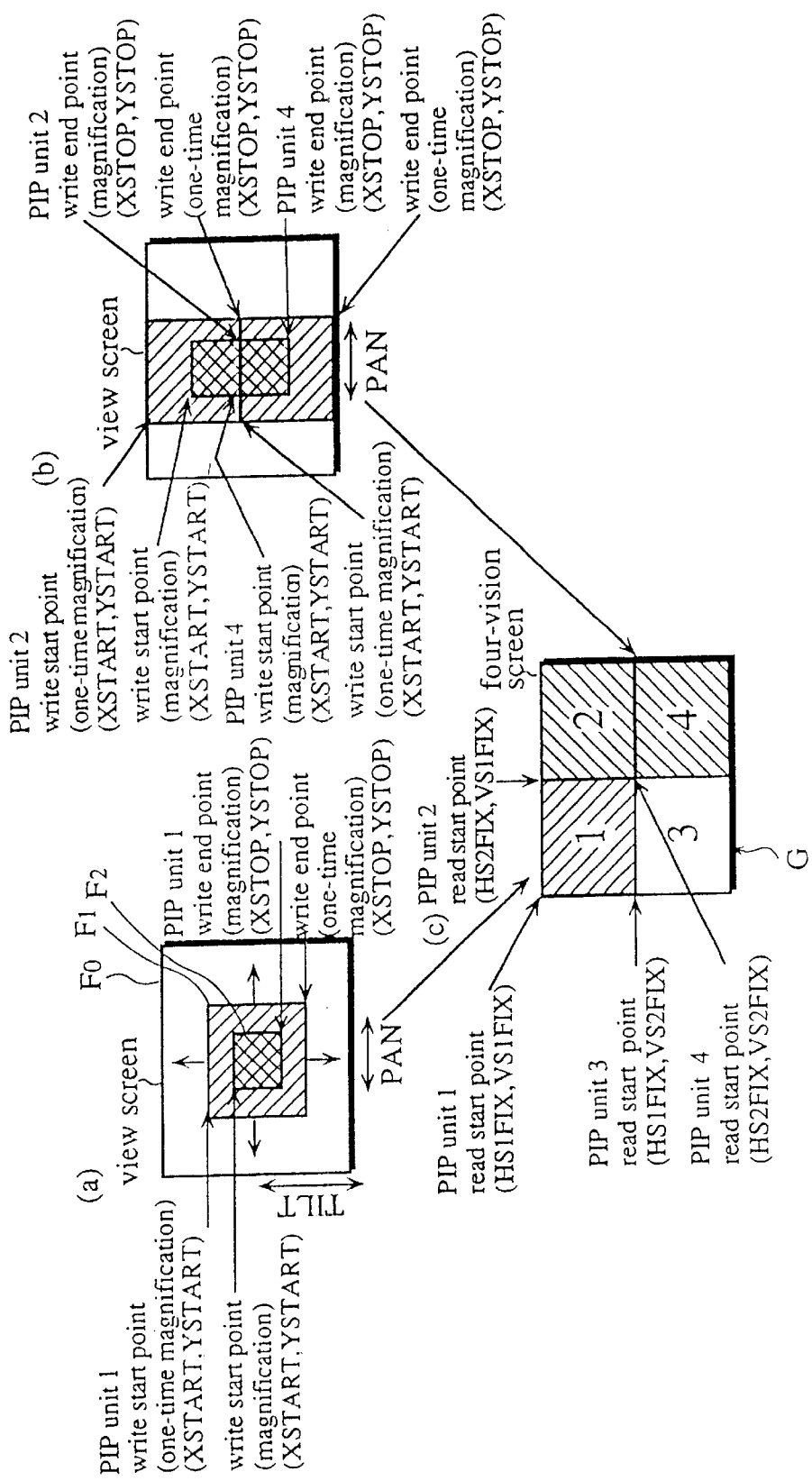
FIG. 3 shows a correspondence between a readout area of an input image and a display part of a multi-vision screen.

The circuit 24 comprises a data translation circuit 241, circuits 242 and 243, a circuit 244, and an output selection circuit 245. The data translation circuit 241 translates the direction inputted from the key matrix 11 into preset logic signals. For example, magnification, one-time magnification, or reduction of the original image is directed. Also a monitoring cameras is designated, so that the input signal from the designated monitoring camera is written into the image memory 21. According to the logic signals from the data translation circuit 241, the circuits 242 and 243 output four signals which represent a read-out area of the original image to be read into the image memory 21, the four signals being XSTART, XSTOP, YSTART, and YSTOP. The signals XSTART and YSTART represent XY coordinates of a start point while the signals XSTOP and YSTOP represent XY coordinates of an end point of the read-out area. When zoom-up magnification of the input image is indicated, the circuit 244 places a switch SW 7 of the writing circuit 22 and a switch SW 8 of the read-out circuit 23 to their zoom-up magnification position. The output selection circuit 245 is synchronized with the designated monitoring camera and switches a selector 1, 2, or 3 of the readout circuit 23 in accordance with the designated monitoring camera. For example, $F_0$ in FIG. 3(*a*) shows a view of the monitoring camera. If one-time magnification of the original image is indicated image signals of the $F_1$ area which is marked with slash lines in the figure will be read out. In this case, the XSTART and YSTART signals represent the upper left corner of the $F_1$ area while the XSTOP and YSTOP signals represent the lower right corner of the same. If zoom-up magnification of the original image is directed, image signals within a cross hatched $F_2$ area will be read out. In this case, the XSTART and YSTART signals represent the upper left corner of the $F_2$ area while the XSTOP and YSTOP signals represent the lower left corner of the same. If reduction of the original image is indicated, the XSTART and YSTART signals represent the upper left corner of the original image while the XSTOP and YSTOP signals represent the lower left corner thereof respectively.

For the one-time magnification, reading from image memory 21 is as fast as the write into the image memory 21. For the zoom-up magnification, writing into the image memory 21 is faster than reading from image memory 21. For the reduction, writing into the image memory 21 is slower than reading from image memory 21.

The writing circuit 22 comprises a synchronous separation circuit 2201, a horizontal counter 2204, a vertical counter 2205, comparators 2206, 2207, an X address counter 2208, and a Y address counter 2209. With this construction, the writing circuit 22 writes an image signal from a monitoring camera or a luminance signal Y of the image signal (in the figure) into the image memory 21. To be precise, the synchronous separation circuit 2201 extracts a horizontal synchronous signal HD, a vertical synchronous signal VD from the luminance signal Y. It is well known that one horizontal synchronous signal is generated for one scanning line, so that over two hundred horizontal synchronous signals are generated for one field. On the other hand, one vertical synchronous signal is generated for one field.

The vertical counter 2205 counts the horizontal synchronous signal HD, and is reset by the vertical synchronous signal VD. Accordingly, each counting number of the vertical counter 2205 indicates a line number currently being scanned on the screen. Here, the final counting number indicates the total number of the horizontal synchronous signals within a field.

While counted by the vertical counter 2205, the horizontal synchronous signal HD is multiplied by a frequency, of a PLL frequency synthesizer 2202. Subsequently, the multiplied signal is divided by a divider 2203 until it becomes a frequency whereby one pixel clock is generated at each scanning of one pixel.

The horizontal counter 2204 counts the pixel clock, and is reset by the horizontal synchronous signal HD. Accordingly, each counting number of the horizontal counter 2204 indicates where on the scanning line the monitoring camera is currently scanning, and its final counting number just before the reset indicates a total number of pixels within the scanning line.

Figure 4:
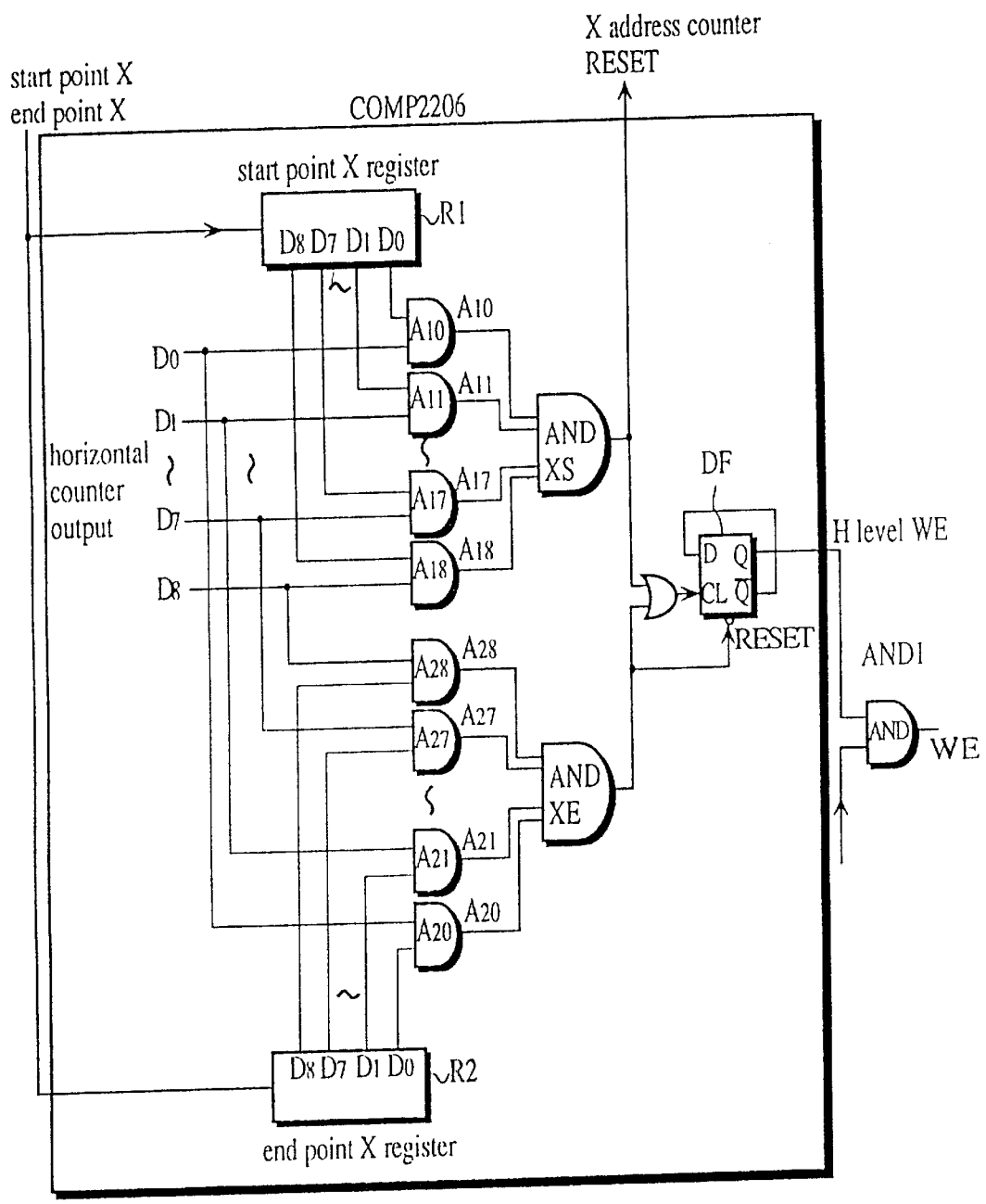
FIG. 4 shows a detailed construction of a comparator 2206 in FIG. 2.
Figure 5:
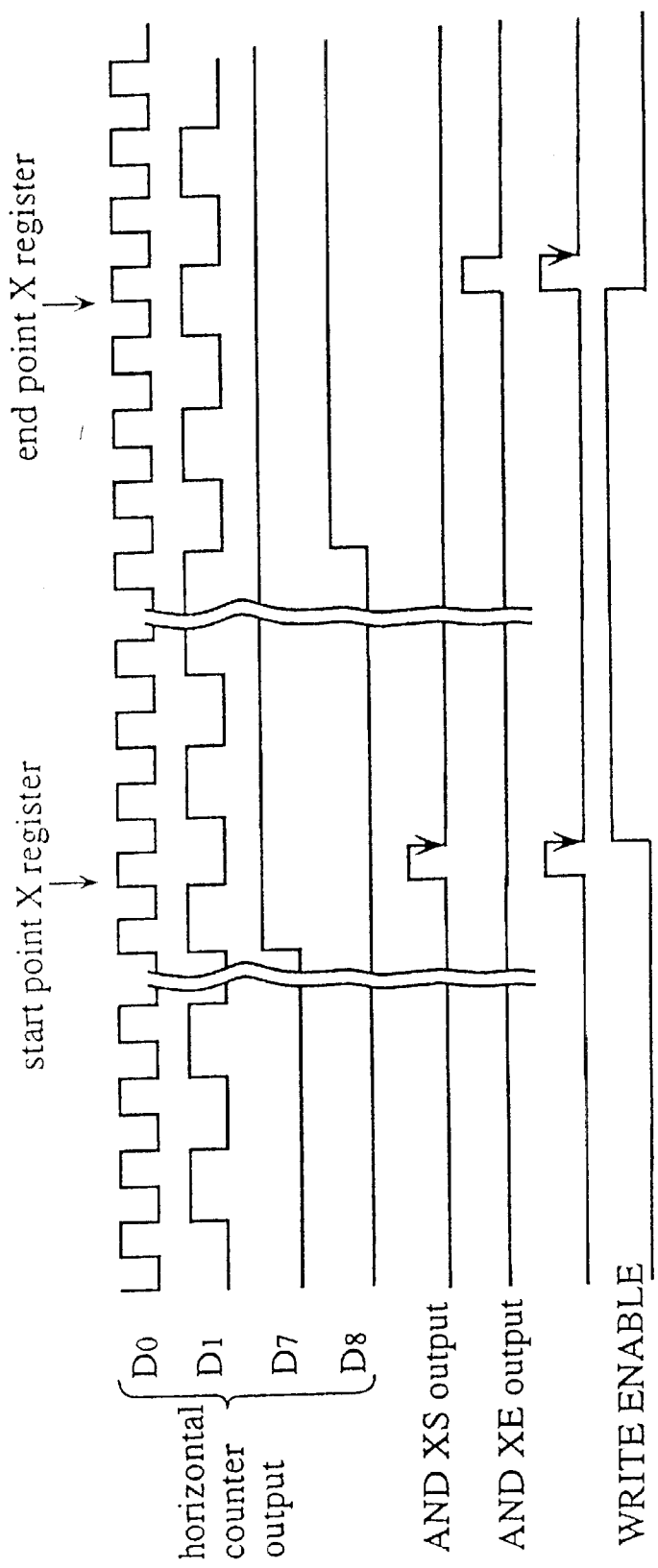
FIG. 5 shows operation of the comparator 2206 in FIG. 4.

Comparator 2206 compares the of the horizontal counter 2204 with the X coordinate of the start point, (XSTART) and the X coordinate of the end point, (XSTOP) which are received from the circuit 242. FIG. 4 shows detailed circuit construction of the comparator 2206. The comparator 2206 in the figure comprises registers R1, R2, AND elements A10–A18, A20–A28, an AND element XS, an AND element XE, and a D flip-flop DF. The registers R1 and R2 hold the XSTART and the XSTOP respectively. The AND elements A10–A18, A20–28 compare binary outputs from the register R1 and R2 with each binary output from the horizontal counter 2204, and generates an H level output when said binary outputs coincide with each other. The AND element XS generates an H level output when the counting number of the horizontal counter 2204 coincides with the XSTART stored in the register R1. The AND element XE generates an H level output when the counting number of the horizontal counter 2204 coincides with the XSTOP stored in the register R2. A logical add of the AND elements XS, XE and the H level output of the AND element XE are inputted to a clock terminal cl and a reset terminal of the D flip-flop DF respectively. Subsequently, the D flip-flop DF generates an H level WE (Write Enable) signal to enable the scanning from the XSTART to the XSTOP in FIG. 5. The output of the D flip-flop signal DF is inputted to an AND circuit 2210.

Figure 2:
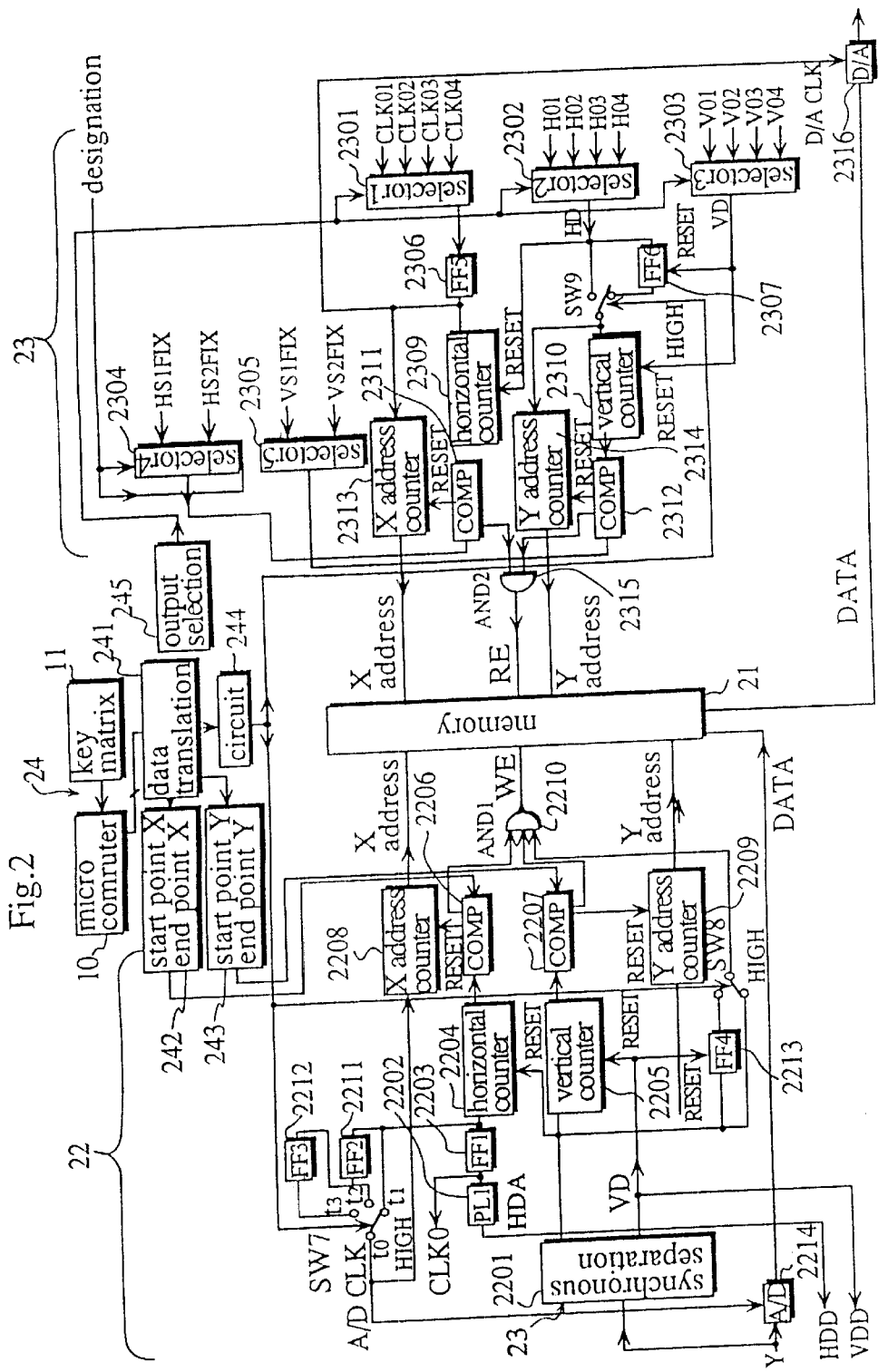
FIG. 2 shows a circuit of a PIP unit in FIG. 1.

The output of the AND element XS is provided to the X address counter 2208 in FIG. 2 as a reset signal. The X address counter 2208 is reset by the reset signal, and counts the pixel clock outputted by the switch SW 7; otherwise it counts the division output of the pixel clock. The counting number of the counter 2208 represents the X address in the image memory 21.

Although not illustrated, the comparator 2207 has substantially the same construction as the comparator 2206. That is, an H level output is provided to an AND circuit AND1 to enable the scanning from the YSTART to the YSTOP. When the scanning line number coincides with the YSTART, the reset signal is provided to the Y address counter 2209. Subsequently, the Y address counter 2209 counts the horizontal synchronous signals HD, whereby the Y address in the image memory 21 is detected.

The switch SW 7 selects a sampling clock of an A/D converter 2214 and a clock of the X address counter 2208. For the zoom-up magnification of the original image, a terminal $t_1$ is connected to a terminal $t_0$ in the figure. For the one-time magnification of the original image, a terminal $t_2$ is connected to the terminal $t_0$. For the reduction of the original image, a terminal $t_3$ is connected to the terminal $t_0$. When $t_1$ is connected to $t_0$, the pixel clock is considered as an output clock. That is, the A/D converter 2214 digitizes and outputs the luminance signal Y for each pixel, and the X address counter 2208 increments its address by one at each pixel clock. When $t_2$ is connected to $t_0$, the divided pixel clock of the divider 211 is considered as an output clock. That is, the A/D converter 2214 digitizes the luminance signal for every other pixel and outputs it; and the X address counter 2208 increments its address by one at each output of the digital signal from the A/D converter 2214. When $t_3$ is connected to $t_0$, the divided pixel clock of the divider 2211 is further divided by a divider 2212; accordingly, the A/D converter 2214 digitizes one pixel for every four pixels, and outputs the digital signal. The X address counter 2208 increments its address by one at each output of the digital signal from the A/D converter 2214.

During the reduction of the original image, the switch SW 8 is switched so that the horizontal synchronous signal HD is divided by the divider 2213 and the divided signal is inputted to the AND circuit 2210. During the one-time magnification or the zoom-up magnification, on the other hand, the switch SW7 is connected as in FIG. 2. Thus, when reducing the original image, the AND gate is opened at every other interval between the outputs of the horizontal synchronous signals HD. When zoom-up magnifying or one-time magnifying the original image, the AND gate is opened at every interval.

Writing of the luminance signal Y into the image memory 21 will be described hereunder. For ease of explanation, the following explanation describes the case when one-time magnification has been specified by the operator. The luminance signal Y is inputted from the monitoring camera to the A/D converter 2214. The A/D converter digitizes the luminance signal for every other pixel, and outputs the digital signal to the image memory 21. If the scanning position is between the upper left corner of the view $F_0$ and the start point of the read-out area (XSTART, YSTART), at least one of the outputs from the comparators 2206 and 2207 is L level. Accordingly, the AND circuit 2210 does not generated a WE signal. As a result, no write into the memory 21 will take place even though the scanned luminance signal is digitized by the A/D converter 2214.

When the scanning reaches the XY coordinates of the start point, XSTART and YSTART, both of the outputs from the comparators 2206 and 2207 become H level. Accordingly, the AND circuit 2210 outputs a WE signal to the image memory 21. Since the X address counter 2208 and the Y address counter 2209 are reset to 0, the luminance signal Y at the start point (XSTART, YSTART) is written into a first address of the image memory 21. Then, as the scanning advances from left to right along the scanning line, the X address counter 2208 counts every other pixel, and stores the digital signal digitized by the A/D converter 2214 into a next address. At each arrival of the scanning at the right end of the scanning line, the scanning moves to a downward scanning line, and the counting number at the Y address counter 2209 is incremented by one. Accordingly, the currently digitized luminance signal is stored into the address designated by the incremented counting number of the Y address counter 2209.

The luminance signal Y within the read-out area $F_1$ is written into the address identified by the counting number of the X address counter 2208 and the Y address counter 2209. When the scanning exceeds the end point (XSTOP, YSTOP), however, the output of a WE signal from the AND circuit 2210 is terminated; accordingly, writing of the luminance signal Y into the image memory 21 is terminated. Thus, the readout area $F_1$ of the view $F_0$ is written into the image memory 21.

For the zoom-up magnification and reduction, the writing is performed in a similar manner. For the zoom-up magnification of the original image, however, the AND circuit 2210 generates a WE signal only when the area $F_2$ is being scanned. Accordingly, only the area $F_2$ of the original image will be written into the image memory 21. Also the sampling clock of the A/D converter 2214 coincides with the pixel clock; and the X address counter 2208 increments its address by one at each pixel clock. Therefore, all the pixels within the area $F_2$ are stored into the image memory 21. For the reduction of the original image, on the other hand, every image signal within the view $F_0$ is stored into the image memory 21; and the A/D converter 2214 digitizes one of every four pixels in the original image. Therefore, the X address counter 2208 increments its address once for each receipt of four pixels. As a result, one of every four pixels in the original image within $F_0$ will be stored into the image memory 21.

The readout circuit 23 comprises selectors 2301–2305, a horizontal counter 2309, a vertical counter 2310 and the like. All the clocks CLK01–04 from the monitoring cameras, horizontal synchronous signals H01–H04, and vertical synchronous signals V01–V04 are inputted to the selectors 2301–2303. When activated by the output selection circuit 245, the selector selects the clock, the horizontal synchronous signal, and the vertical synchronous signal of the monitoring camera which is currently inputting a luminance signal to the writing circuit 22. X and Y coordinates of a display start point are inputted to the selectors 2304 and 2305. FIG. 3(b) shows a display screen G divided into four subscreens. The display start points in a subscreen 1, 2, 3, and 4 are HS1FIX/VS1FIX, HS2FIX/VS1FIX, HS1FIX/VS2FIX, and HS2FIX/VS2FIX respectively.

A ¼ divider 2306 has two dividers which are connected in series. The clock CLK01 outputted from the selector 2301 has a higher frequency in pulse than one pixel scanned with the monitoring camera, so that the CLK01's frequency is divided by the ¼ divider 2306 to be half of the pixel clock frequency. The horizontal counter 2309 counts the clock CLK01. In the same way as the horizontal counter 2204 in the writing circuit 22, the horizontal counter 2309 is reset by the horizontal synchronous signal HO. The counter 2204 and the counter 2309, however, are not necessarily reset together. That is, the counter 2309 counts and gets reset independently from the counter 2204; as a result, the readout circuit 23 has its own operation timing. The vertical counter 2310, the comparators 2311, 2312, the X address counter 2313, and the Y address counter 2314 operate substantially in the same way as their counterparts in the writing circuit 22, and the description is not repeated.

The comparators 2311, 2312 generate an H level output, open the gate of the AND circuit 2315, and sends a READ ENABLE (RE) signal to the image memory 21 when the counting number of the horizontal counter 2009 and the vertical counter 2310 are respectively larger than coordinates HS1FIX and VS1FIX of the display start point. When the image memory is in the READ ENABLE state, data is read from the address identified by the X address counter 2312 and the Y address counter 2314. The signal read out from the image memory 21 is converted into an analog luminance signal Y by the D/A converter 2316. When the operator indicates the magnification using by the switch SW 9, the horizontal synchronous signal H01 is divided by the divider 2307 and the divided signal is provided to the vertical counter 2310. Accordingly, twice the time is taken by one increment of the vertical counter 2310, so that the horizontal counter 2309 will be reset twice at each increment of the vertical counter 2309. Thus, each scanning line in the image memory 21 is read twice consecutively, and hence the input image can be magnified vertically. Although the counter 2208 in the writing circuit increments itself differently during the zoom-up magnification, the one-time magnification, and the reduction display, the X address counter 2313 in the readout circuit counts equally in every case. To be precise, the X address counter 2313 counts every other count clock from the divider 230.

The PIP units 1–4 are constructed as shown in FIG. 2. In this construction, if the switches SW1–4 are placed at the position p1, the images from four monitor cameras are displayed on a four-vision screen in FIG. 3(c). Also each subscreen of the four-vision screen can display one-time magnification, reduction, or zoom-up magnification of the original images independently.

FIG. 3(b) shows a two-vision screen. When switches SW1–4 are placed at the position p2, the original image from a monitoring camera 1 is inputted to the PIP units 1, 3 through the switches SW1 and SW3 respectively, and the original image from a monitor camera 2 is inputted to the PIP units 2, 4 through the switches SW 2 and SW4 respectively. Subsequently, the PIP units 1, 3 and 2, 4 decide the XSTART, YSTART, XSTOP, and YSTOP to have the vertically divided two-vision screen. If desired, each of the original images from the two monitors can be zoom-up magnified, one-time magnified, or reduced independently.

When switches SW1–4 are placed at the position p3, the original image from a monitoring camera 3 is inputted to the PIP units 1, 3 by the switch SW1, SW3 respectively, and the original image from a monitoring camera 4 is inputted to the PIP unit 2, 4 by the switch SW2, SW4 respectively. Accordingly, the original image from the monitoring camera 3 is displayed on the subscreens 1, 3 while the original image from the monitoring camera 4 is displayed on the subscreens 2, 4. Also by changing the connection between the switches SW1–SW4 and the monitors 1–4, the original images from the monitors 3 and 4 can be displayed on the horizontally divided two-vision screen. Further, if desired, each of the original images can be zoom-up magnified, one-time magnified, or reduced independently.

When placing SW 1–4 at the position p4, the original image from one monitoring camera will be displayed over the whole display screen G. That is, a quarter of the original image is displayed on a quarter subscreen of the four-division screen by one of the PIP units 1–4.

Besides the zoom-up magnification, the one-time magnification, and the reduction, the microcomputer 10 can PAN/TILT the original image, and this will be described hereunder. Here, PAN/TILT refers to smooth displacement of the original image horizontally and vertically at a constant speed. For example, in FIG. 3(a) the readout area $F_1$ (or $F_2$) of the view $F_0$ will be displaced in the directions shown by the arrows.

When PANning (smooth horizontal displacement) the original image, the X coordinate of the readout area, XSTART will change uniformly and consecutively during the zoom-up magnification and one-time magnification. It is assumed that the original image displaces horizontally in 256 dots (a horizontal displacement distance: $X_1-X_2=256$ dots) and the XSTART is increased/decreased by one bit per field. According to the NTSC (National Television Standards Committee) TV signal standard in Japan and the United States, one field is scanned at $\frac{1}{60}$ second. Accordingly, the original image can displace 256 fields in about 4 seconds. When PANning the original image from left to right, the XSTART increases. When PANning the original image from right to left, the XSTART decreases.

When TILTing (smooth vertical displacement) the original image, the Y coordinate of the start point, YSTART, changes uniformly. It is assumed that the original image displaces in 110 H (Horizontal lines) to be written into or read from the image memory 21; and the YSTART increases/decreases by ½ H per field. In this case, the input image can displace 110 H in around four seconds. When TILTing the original image downward, YSTART is increased. When TILTing the original image upward, on the other hand, the YSTART decreases.

Because of said PAN/TILT, anywhere in an effective display area (90% of a general television screen) of the multi-vision screen can be examined. Also with a combination of the PAN for horizontal displacement and the TILT for vertical displacement, the original image can be displaced diagonally. For example, by increasing the XSTART and the YSTART simultaneously, the original image can be displaced diagonally to the lower right corner of the view $F_0$. By decreasing the XSTART and the YSTART simultaneously, on the other hand, the original image can be displaced diagonally to the upper left corner of the view $F_0$. Thus, any combination of the horizontal, the vertical, and the diagonal displacement is realized by setting the corresponding XSTART and YSTART. The STEP SHIFT displaces an input image by a longer distance than the PAN and TILT. Accordingly, when STEP SHIFTing the original image, the break between the writes is extended, and the write start point will change at a certain interval.

Figure 7:
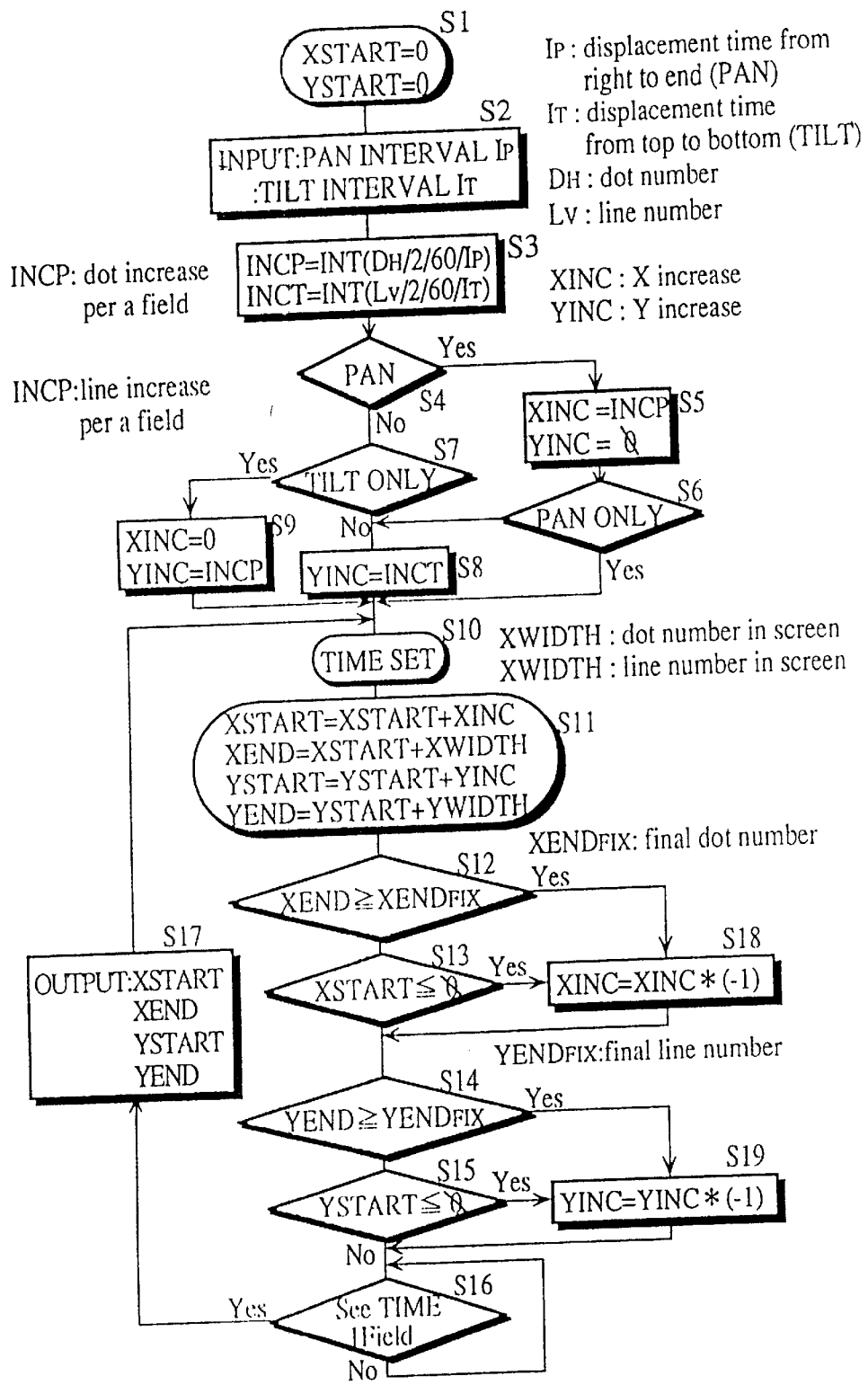
FIG. 7 is a flow chart of PAN/TILT operation.

A detailed PAN/TILT operation will be described with reference to FIG. 7. The XSTART, YSTART are initialized to be 0 (S1). The operator directs desired displacement times $I_P$, $I_T$ (S2). The input image is displaced horizontally by $D_P$ dots and vertically $L_V$ lines in $I_P$ and $I_T$ seconds. Accordingly, the PAN speed (INCP) and the TILT speed (INCT) are detected. The INCP represents a dot number to be increased horizontally per field; and the INCT represents a line number to be increased vertically per field (S3). When PANning the original image (S4), the INCP at S3 is stored into the X register as the X increase, XINC. When TILTing the original image (S6), the INCP at S3 is stored into the Y register as the Y increase, YINC (S8). If either of the PAN and TILT operation is designated exclusively at S2, only the XINC or the YINC is stored into the corresponding register at S5 or S9 respectively.

When said steps are completed, a timer is turned on so that it will increment itself at each scanning of one field (S10). The start point XSTART, YSTART and the end point XSTOP, YSTOP are figured out from a predetermined operation formula (S11). Note that XWIDTH in this formula represents the number of dots in a horizontal line in the quarter subscreen, while YWIDTH represents the number of vertical lines.

The XSTART and YSTART at S11 are larger than the initial XSTART and YSTART at S1 by the XINC and YINC stored in the X, Y registers. It is judged if the start point XSTART, YSTART at S11 places outside the view $F_0$ at S12–S15. If it places within the view $F_0$ (S12–S15) and the timer indicates that one field scanning time has passed (S16), the microcomputer 10 inputs the start point XSTART, YSTART to the PIP units 1–4 (S17).

The PAN/TILT operation returns to S10 to set the timer. The XSTART and YSTART are incremented by the XINC and YINC respectively while the XSTOP and YSTOP are incremented by XWIDTH and YWIDTH respectively. If all the incremented XSTART, YSTART, XSTOP, and YSTOP are placed within the view $F_0$ (S12–S15), and the timer indicates that one field scanning time has passed (S16), the microcomputer 10 input those XSTART, YSTART, XSTOP, and YSTOP to the PIP units 1–4 (S17). Thus, S10–S17 are repeated at each scanning of one field; accordingly, the readout area PANs or TILTs on the view $F_0$ at a constant speed. If it is judged at S12 that the right end of the PANned read out area goes beyond the right end of the view $F_0$, the XINC is converted into its negative counterpart (S18). Therefore, the XINC is subtracted from the XSTART, and the readout area will be displaced to the left. Then, if the left end of the PANned read out area comes left of the left end of the view $F_0$ at S13, the XINC is returned into its positive counterpart. Thus, in PANning, the readout area displaces to the right or to the left. Similarly, in TILTing, the readout area displaces upward or downward. The PAN and TILT operation continue until another operation is selected.

Figure 6:
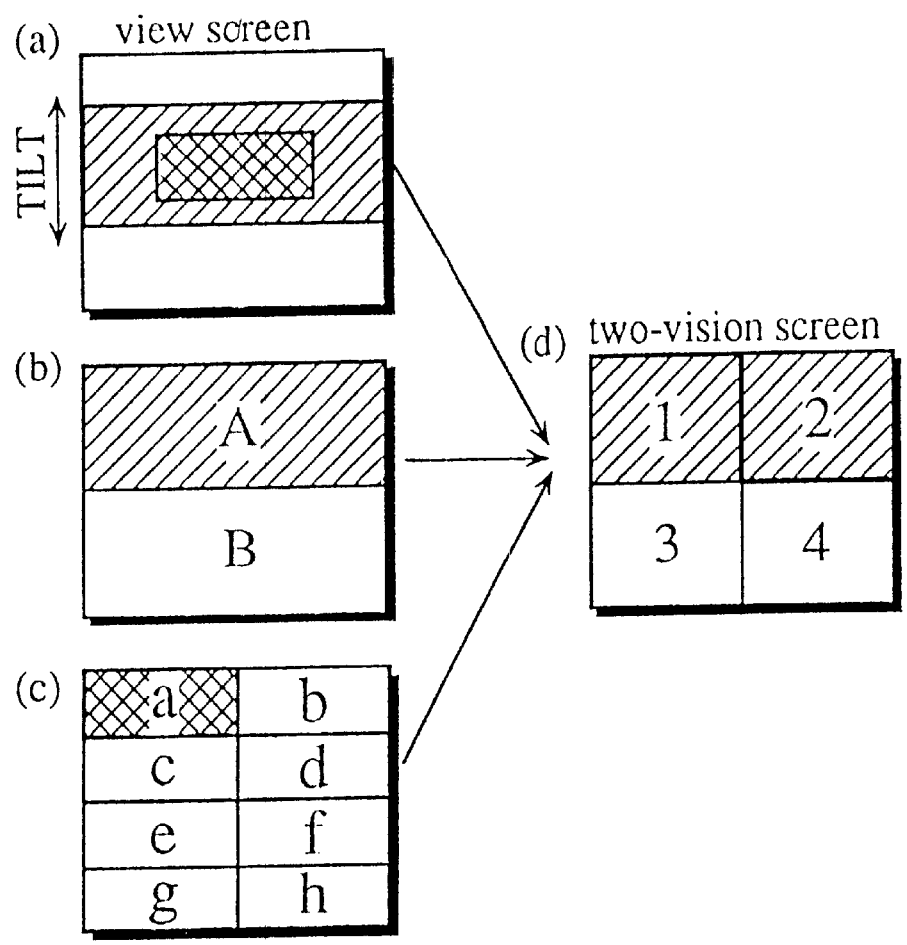
FIG. 6 shows a correspondence between a readout area of an input image and a display part of a horizontally divided two-vision screen.
Figure 8:
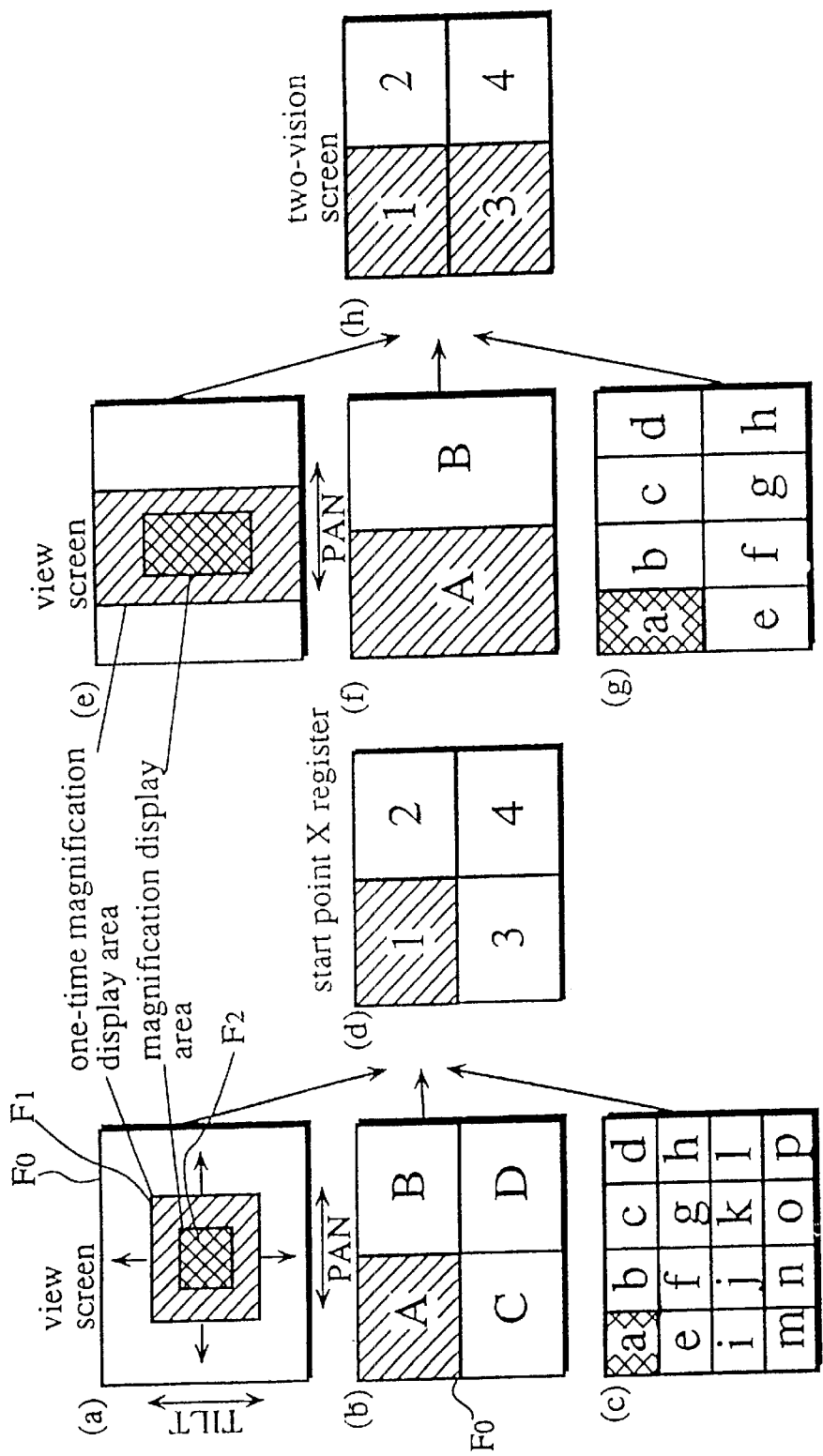
FIG. 8 shows a correspondence between a readout area of an input image and a display part of a four-vision screen and a vertically divided two-vision screen.

The STEP SHIFT operation will be described with reference to FIG. 8(b). In the STEP SHIFT operation, the view $F_0$ is divided into four areas A, B, C, D; and each of the area is written into the image memory 21 of the PIP unit alternatively at a certain interval. Although in the figure one-time magnification of the original image is displayed, the reduction or zoom-up magnification of the same can also be displayed. FIG. 8(c) shows the zoom-up magnification of the original image. In the figure the view $F_O$ is divided into 16 areas a–p, and each of the areas a–p is written into the image memory 21 alternatively. Thus, the STEP SHIFT is operated by switching the areas A–D, or a–p at a constant speed, and the switching of the subscreen is controlled by the microcomputer 10 which changes the XSTART, YSTART, XSTOP, and YSTOP in accordance with the designated area. Besides switching the area of the view $F_O$, the STEP SHIFT can be operated by switching subscreens of the display screen G. In FIGS. 8(f), (g), (h) the display screen G is vertically divided into two subscreens, and the STEP SHIFT is operated in each subscreen. In FIGS. 6(b), (c), (d) the display screen G is horizontally divided into two subscreens, and the STEP SHIFT is operated in each subscreen.

Embodiment 2

Figure 9:
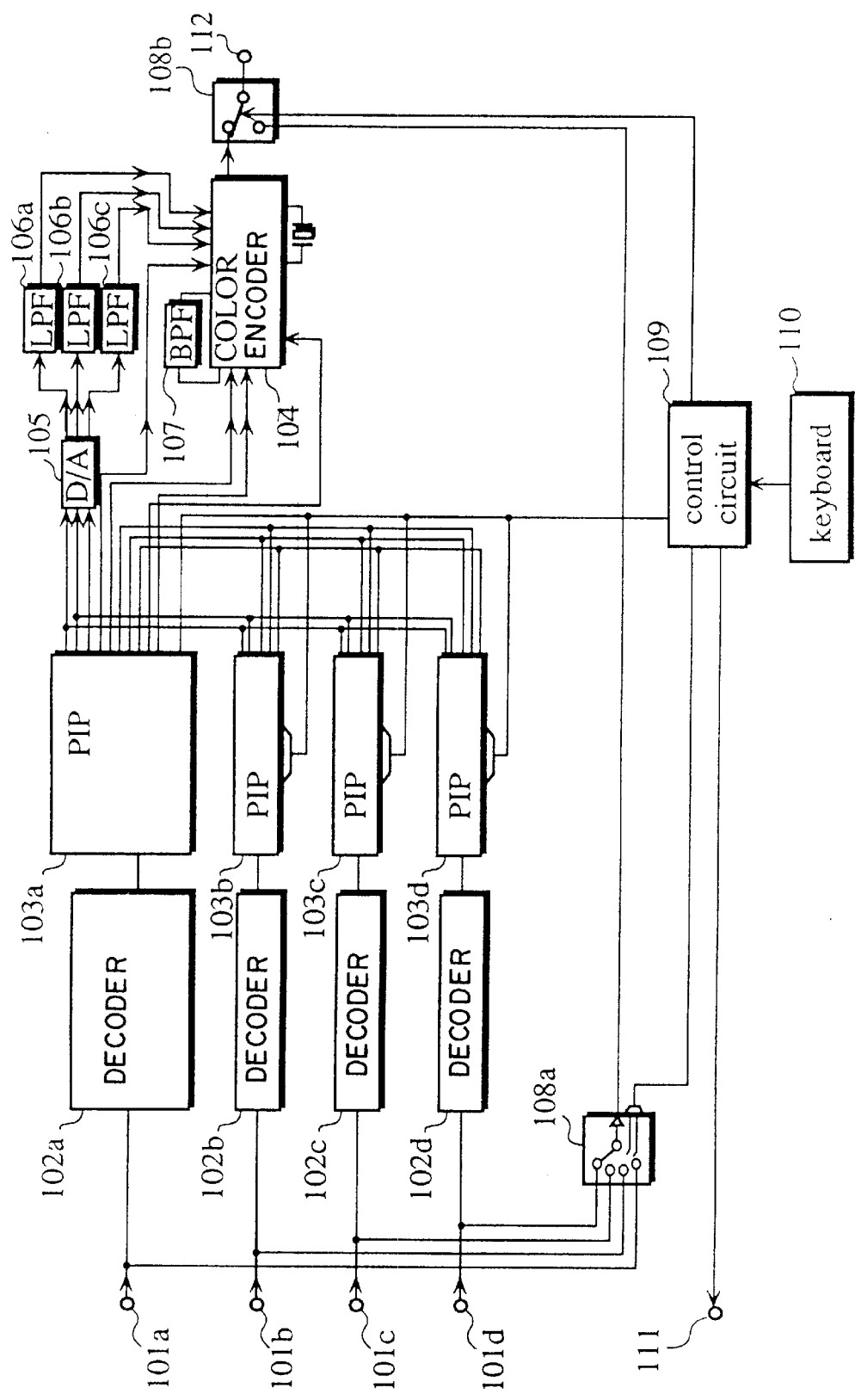
FIG. 9 shows construction of a multi-vision adapter in another embodiment.

In a second embodiment, while displaying original images from a plurality of monitoring cameras on a multi-vision screen, any movement in the original image, such as invasion by a suspect, can be detected. FIG. 9 shows construction of a multi-vision screen adapter. FIG. 9 is substantially same as FIG. 1 except that the adapter does not display two original images on the horizontally or vertically divided two-vision screen but always displays four original images on a four-vision screen.

The multi-vision screen adapter in the figure comprises a control circuit 109, a keyboard 110, an alarm output terminal 111, and a n image output terminal 112. The control circuit, comprises input terminals 101a–101d, decoders 102a–102d, PIP u nits 103a–103d, a color encoder 104, a D/A converter 105, a low-pass filters 106a–106c, a bandpass filter 107, switches 108a, 108b, and a microcomputer.

Image signals from monitoring cameras are inputted to the input terminals 101a–101d.

In accordance with the image signals inputted to the input terminals 101a–101d from the four monitoring cameras, the decoders 102a–102d demodulate a luminance signal and a color-difference signal; and provides them to the PIP units 103a 103d.

The PIP units 103a–103d converts the luminance signal and the color-difference signal into the digital signals, and provides them to the D/A converter 105 at a preset timing. The PIP units 103a–103d operate horizontal or vertical reduction of the original image. When reducing horizontally, the PIP units 103a–103d set a write speed into a memory 120b (FIG. 10) different from a read speed of the image memory. When reducing vertically, the PIP units 103a–103d thin out some lines of the original image.

The control circuit 109 controls the switches 108a, 108b and also controls the PIP units 103a–103d in accordance with the direction entered from the keyboard 110.

The D/A converter 105 converts the digital data from the PIP units 103a–103d into analog signals, and provides the analog signals to the color encoder 104.

The color encoder 104 modulates the analog signals from the D/A converter 105 into video signals, and outputs the video signals to the image output terminal 112.

Figure 10:
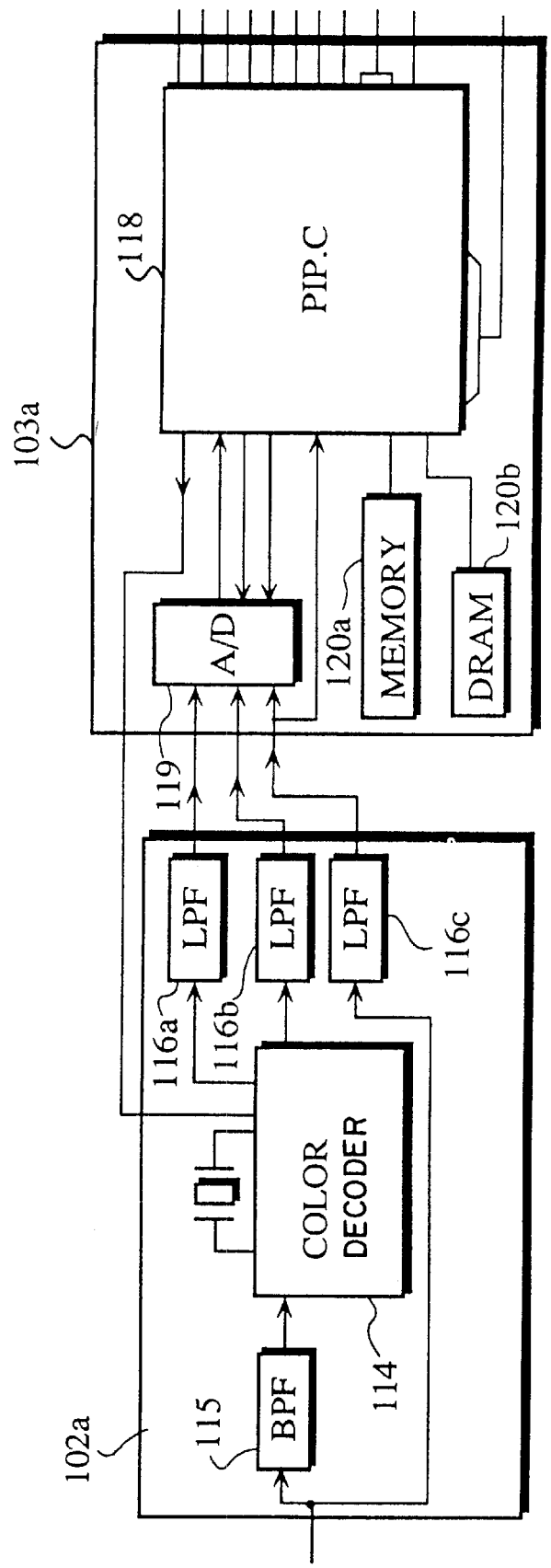
FIG. 10 shows construction of a decoder and a PIP unit included in the multi-vision screen adapter in FIG. 9.

Construction of the decoder 102a and the PIP unit 103a will be described with reference to FIG. 10. In the figure, the decoder 102a is comprised of a color decoder 114, a bandpass filter 115, and low-pass filters 116a–116c; while the PIP unit 103a is comprised of a PIP circuit 118, an A/D converter 119, said memory 120a (line memory), and a memory 160b (DRAM). The decoders 102a–102d and the PIP units 103a–103d are constructed substantially the same as the decoders and the PIP units in said multi-vision adapter except that the PIP units 103a–103d have an image sensor. Accordingly, the description will not be repeated.

Figure 11:
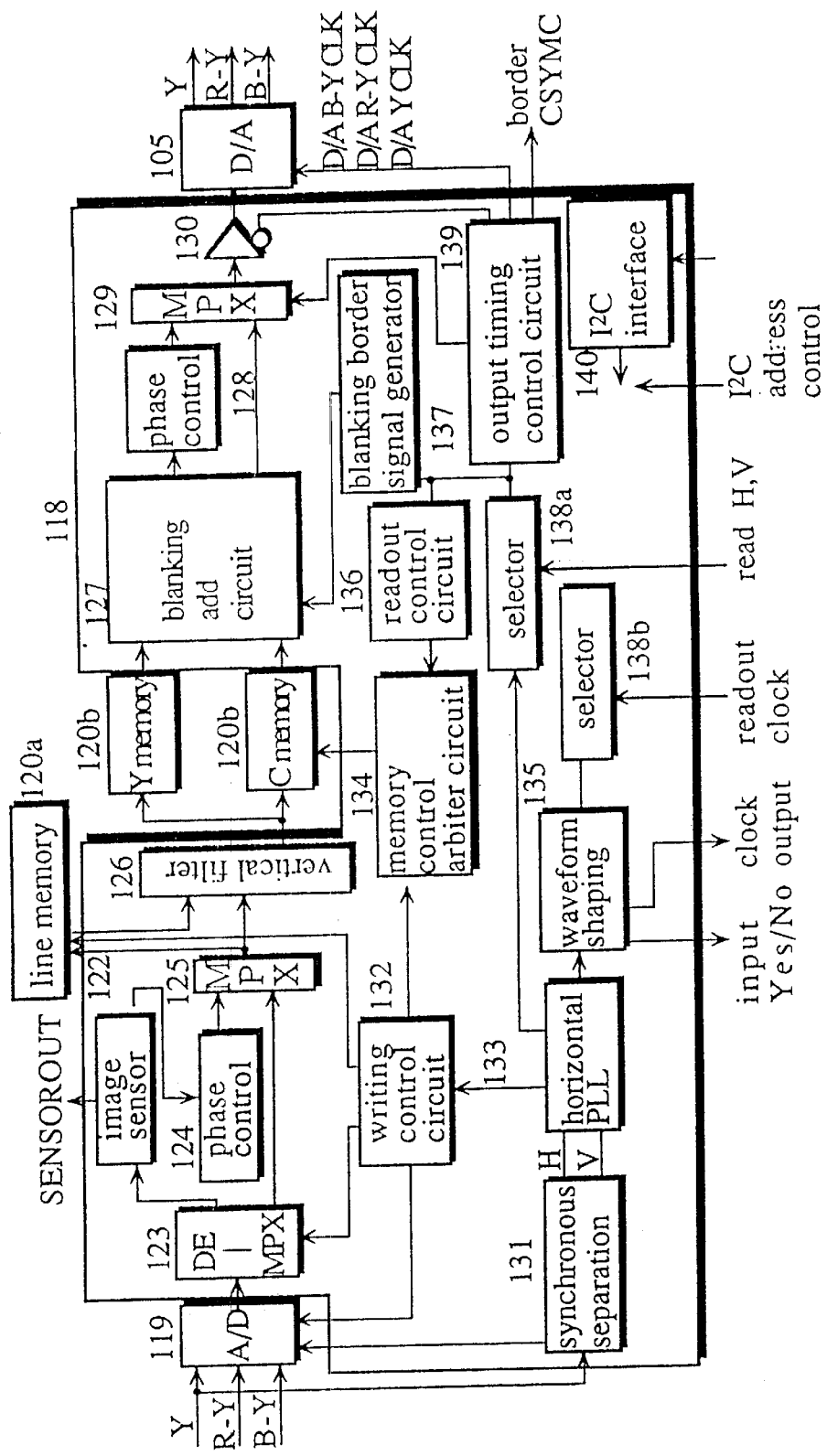
FIG. 11 shows a detailed construction of the PIP circuit included in the multi-vision screen adapter in FIG. 9.

The PIP circuit 118 will be described with reference to FIG. 11. The PIP circuit 118 in the figure comprises an image sensor 122, a demultiplexer 123, a phase control circuit 124, a multiplexer 125, a vertical filter 126, a blanking add circuit 127, a phase control circuit 128, a multiplexer 129, a 3-state buffer 130, a synchronous separation circuit 131, a writing control circuit 132, a horizontal PLL circuit 133, a memory control arbiter circuit 134, a waveform shaping circuit 135, a readout control circuit 136, a blanking border signal generation circuit 137, selectors 138a, 138b, an output timing control circuit 139, and an $I_2C$ interface 140. The PIP circuit 118 operates substantially the same as the conventional PIP circuit except the image sensor 122; and the operation of the PIP circuit 118 will be omitted.

Figure 12:
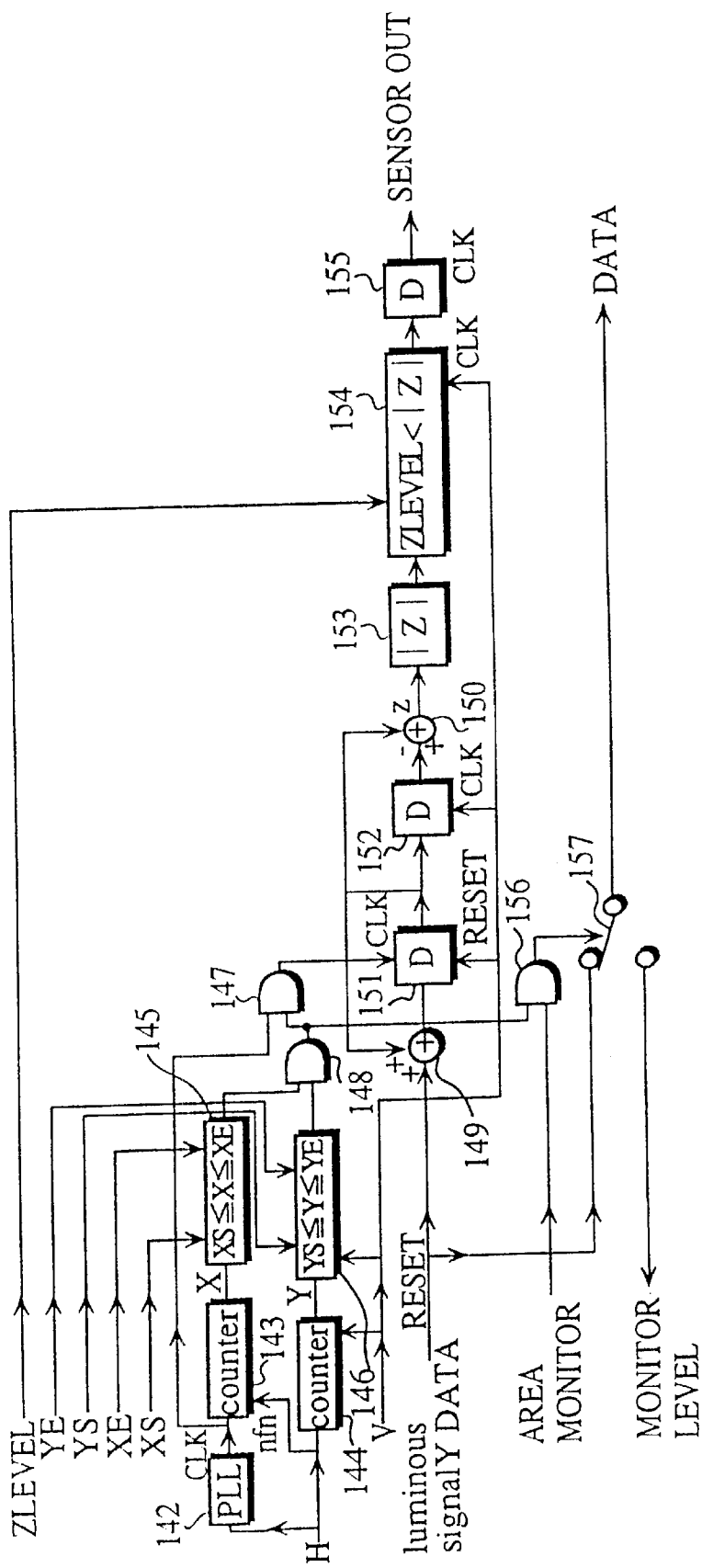
FIG. 12 shows construction of an image sensor included in the PIP circuit in FIG. 11.

The image sensor 122 will be described with reference to FIG. 12. The image sensor 122 in the figure comprises a PLL circuit 142, a horizontal counter 143, a vertical counter 144, comparison circuits 145, 146, AND circuits 147, 148, an adder 149, a subtracter 150, D flip-flops 151, 152 of preset bit numbers 151, 152, an absolute value circuit 153, a comparison circuit 154, a D flip-flop 155, an AND circuit 156, and a switch 157.

The PLL circuit 142 generates a clock CLK of $nf_H$ frequencies with reference to a horizontal synchronous signal H of $f_H$ frequencies, extracted from the luminance signal Y by the PIP circuit 118. The number of pixels in a line corresponds to n in said $nf_H$ frequencies.

The horizontal counter 143 counts the clock CLK from the PLL circuit 142.

The vertical counter 144 counts the horizontal synchronous signal H.

The comparison circuit 145 compares a start point XS and an end point XE of a detection area with the counting number of the horizontal counter 143, the start point XS and end point XE received from the control circuit 109 representing a horizontal range of the detection area. If the XS and XE are placed within the detection area, the comparison circuit 145 outputs an H level signal.

The comparison circuit 146 compares a start point YS and an end point YE of the detection area with the counting number of the vertical counter 144, the start point YS and end point YE received from the control circuit 109 representing a vertical range of the detection area. If the YS and YE are place within the detection area, the comparison circuit 146 outputs an H level signal.

The AND circuit 147 outputs an AND of the clock CLK from the PLL circuit 142 and the output from the AND circuit 148.

The AND circuit 148 outputs an AND of the output from the comparison circuit 145 and the output from the comparison circuit 146.

The adder 149 adds digitized luminance signal DATA from the demultiplexer 123 (FIG. 11) and an output from the D flip-flop 151.

The subtracter 150 subtracts the output from the D flip-flop 151 out of the output from the D flip-flop 152.

The D flip-flop 151 holds the output from the adder 149 at a timing of the output from the ADD circuit 147.

The D flip-flop 152 holds the output from the D flip-flop 151 at a timing of the vertical synchronous signal V for one monitor frame, separated from the luminance signal Y by the PIP circuit 118.

The absolute value circuit 153 figures out the absolute value of the output from the subtracter 150.

The comparison circuit 154 compares the output from the absolute value circuit 153 with a detection level ZLEVEL from the control circuit 109, and outputs an H level signal when the former is larger than the latter.

The D flip-flop 155 holds the output from the comparison circuit 154 at a timing of the horizontal synchronous signal V, and outputs it as a detection signal of the image sensor 112.

The AND circuit 156 outputs an AND of the output from the AND circuit 148 and an area monitor signal, AREA·MONITOR, from the control circuit 109.

The switch 157 is switched by the AND circuit 156 to provide the luminance signal DATA to the phase control circuit 124 (FIG. 11) or is switched thereby to provide a fixed MONITOR LEVEL from the control circuit 109 to the same.

Operation of the image sensor 122 with the above construction will be described hereunder. The user enters from a keyboard a detection area and a detection level ZLEVEL of each monitor, the detection area representing where a change in the display is examined while the detection level ZLEVEL representing a threshold detection value. Accordingly, the control circuit 109 holds the start point XS, YS and the end point XE,YE of the detection area as well as the detection level ZLEVEL for each monitor.

The image signal from each monitor is inputted to the decoder 102a–102d through the input terminals 101a–101d respectively. The decoder converts the input signal into the luminance signal and the color-difference signal and provides them to the PIP units 103a–103d. The A/D converter 119 converts the analog luminance signal and color-difference signal into their digital counterparts, and provides the luminance signal DATA to the image sensor 122 via the demultiplexer 123 of the PIP units 103a–103d. The luminance signal DATA are provided to the adder 149; also it is usually provided to the phase control circuit 124 via the switch 157.

The PLL circuit 142 generates the clock CLK of $nf_H$ frequencies in accordance with the horizontal synchronous signal H of $f_H$ frequencies. The horizontal counter 143 counts the clock CLK. That is, n in the $nf_H$ frequencies corresponds to the number of pixels in a line, and the horizontal counter 143 counts it and is reset by the horizontal synchronous signal. The comparison circuit 145 compares X coordinates of the start point XS and the end point XE of the detection area with the counting number of the horizontal counter 143; and outputs an H level signal when XS≦X≦XE, or in other words when the pixel number counted by the counting number is within the detection area. The vertical counter 144 counts the horizontal synchronous signal H, and gets reset by the vertical synchronous signal V. That is, the vertical counter 144 counts the number of lines, and the comparison circuit 146 compares the counting number Y of the counter 144 with Y coordinates of the start point YS and the end point YE of the detection area. The vertical counter 144 outputs an H level signal when YS≦X≦YE, or, in other words when the line number counted by the counter 144 is within the detection area. The AND circuit 148 computes the AND of the output from the comparison circuit 145 and the output from the comparison circuit 146; and generates an H level signal when they are within the detection area. The AND circuit 147 computes the AND of the clock CLK from the PLL circuit 142 and the signal from the AND circuit 148; and provides the H level signal for each pixel as a trigger signal to the D flip-flop 151.

The digital luminance signal DATA from the demultiplexer 123 is added to the output from the D flip-flop 151. The addition result for each pixel is inputted to the D flip-flop 151; and the D flip-flop 151 is reset by the vertical synchronous signal V. Thus, the sum of the luminance signal DATA for the pixels within a current monitoring frame is stored into the D flip-flop 151. On the other hand, the sum of the luminance signal DATA for the pixels within the last monitoring frame is stored in the D flip-flop 152. The subtracter 150 subtracts the output from the D flip-flop 151 from the output from the D flip-flop 152, and provides the substraction result Z to the absolute value circuit 153. That is, when a frame of the luminance signal DATA is stored in the D flip-flop 151, the subtracter 150 subtracts the sum of the luminance signal DATA for the current monitoring frame from the sum of the luminance signal DATA for the last monitoring frame. The absolute value circuit 153 finds the absolute value abz of the substraction result Z, and the comparison circuit 154 compares it with the detection level from the control circuit 109. If ZLEVEL≦abz, the comparison circuit 154 outputs an H level signal. This H output from the comparison circuit 154 is stored into the D flip-flop 155 at a timing of the vertical synchronous signal V, and it is provided to the control circuit 109 as an output signal from the image sensor 122. Thus, a change in the display is detected by comparing the difference between the sum of the luminance signal DATA for the current monitoring frame and the sum of the luminance signal DATA for the last monitoring frame with the detection level Z. When a change is detected, the control circuit 109 outputs an alarm signal. Subsequently, the vertical synchronous signal V triggers the D flip-flop 152 to update its content, while the D flip-flop 151 is reset to start another storing.

Figure 13:
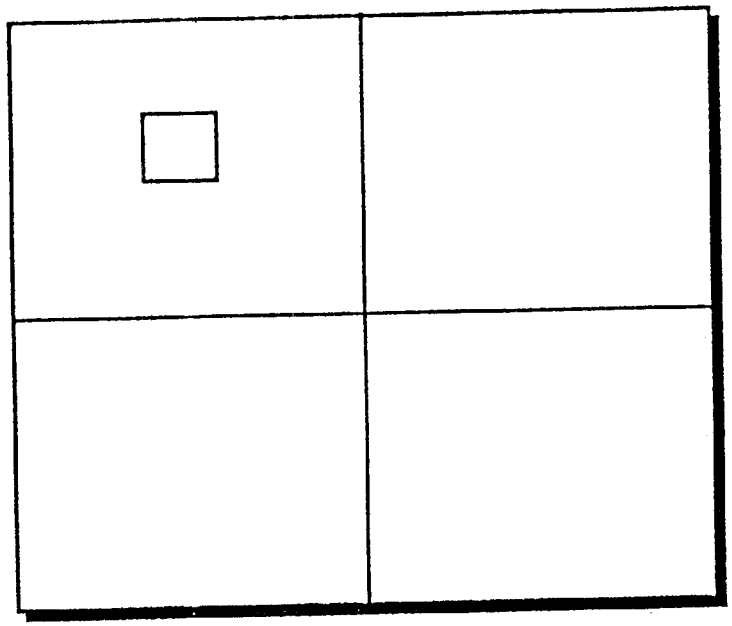
FIG. 13 shows a detection area of a four-vision screen.
Figure 14:
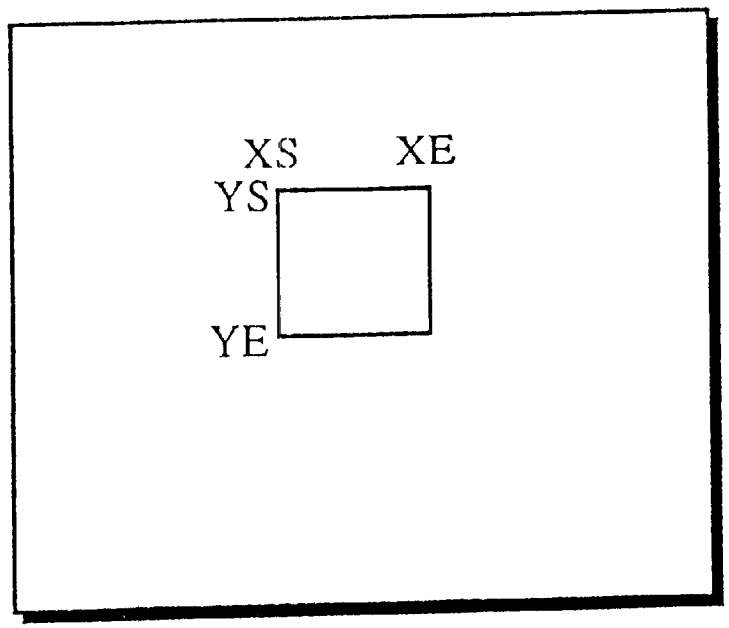
FIG. 14 shows a detection area of a one-vision screen.

To display the detection area, the user enters a preset input from the keyboard. Accordingly, an H level signal, AREA·MONITOR is inputted from the control circuit 109 to one of the input terminals of the AND circuit 156. The output from the AND circuit 148 is inputted to the other input terminal of the AND circuit 156. The output from the AND circuit 148 becomes its H level when it represents the pixel within the detection area; hence, the output from the AND circuit 148 shows H level only within the detection area. According to the H level output, the switch 157 is switched to have the control circuit 109 input a fixed level MONITOR·LEVEL signal, to the phase control circuit 124 instead of the luminance signal DATA. For example in FIG. 13, the detection area of the monitor screen is colored. Also in FIG. 14 the detection area of the four-vision screen is colored.

The detection signal is provided from the image sensor 122 to the control circuit 109. When a change is detected in the monitor display, the control circuit 109 makes an alarm display at a predetermined place of the monitor screen, such as a written monitor display. The user directs the control circuit 109 to control the switches 108a, 108b to display only the image with a change. Further, the control circuit 109 outputs an alarm signal to the alarm output terminal 111. The detection signal from the image sensor 122 is filtered by the control circuit 109, so that any chattering type change is prevented.

Thus, the image sensor 122 operates detection area judge means, sum computation means, sum storage means, difference computation means, and alarm signal output means. The detection area judge means is comprised of the PLL circuit 142, the horizontal counter 143, the vertical counter 144, the comparison circuits 145 and 146, and the ADD circuits 147 and 148. With this construction, the detection area judge means judges if the digital luminance signal represents the pixel within the detection area by referring to the horizontal synchronous signal and the clock signal generated in accordance with the horizontal synchronous signal. The sum computation means is comprised of the adder 149 and the D flip-flop 151, and it computes the sum of the luminance signal representing the pixels within the detection area. The sum storage means holds the computation result of the sum computation means for each monitor frame. The difference computation means is comprised of the subtracter 150 and the absolute value circuit 153, and it computes the difference between the sum for the current frame and the sum for the last frame. The alarm signal output means is comprised of the comparison circuit 154 and the D flip-flop 155, and it compares the difference computed by the difference computation means with a threshold value; and outputs an alarm signal when the former is larger than the latter. Hence, a change in the monitor can be accurately detected based on the difference in the digital luminance signal.

It is very helpful to have the control circuit 109 make an warming display on receipt of the alarm signal from the image sensor 122. Also; since the image sensor 122 is constructed in the PIP circuit 118, the PIP circuits 118 and the image sensor 122 can be integrated into an integrated circuit; and this will decrease the production cost.

Although the sum of the luminance signal for each monitoring frame is computed and the existence/absence of a change is examined in each monitoring frame, it can be examined in each field by computing the sum of the luminance signal for each field.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A multi-vision screen display device comprising:

a display screen divided into a plurality of areas for respectively displaying a plurality input images on respective preset areas, wherein each input image is output from a different one of a plurality of image sensing means;

a plurality of image processing units, each corresponding to one of said processed areas and each receiving a respective one of the input images and outputting the respective one of the input images at a timing to display it on the corresponding preset area;

an input image distributing means for distributing the input images each to a corresponding one of the image processing units; and a display control means for controlling the corresponding image processing unit to zoom-up magnify the input image to be displayed on the corresponding preset area independently of the other areas, wherein each one of said plurality of process units comprises an image memory, a writing means for writing the input image onto the image memory and a reading means for reading the image from the image memory, wherein, for each image processing unit, said reading means reads the image from the image memory at a timing which realizes to display the image on the corresponding preset area, and wherein the display control means controls a writing speed of the writing means and a reading speed of the reading means at the image processing unit which is designed to operate a zoom-up magnification of the image, and wherein the display control means further comprises a readout area selecting means for selecting a size of a readout area within a scanning field of the input image, in which the readout area represents the image to be read from the scanning field and displayed on the corresponding preset area of the display screen.

2. The multi-vision screen display device of claim 1, wherein the display control means further comprises a readout area displacing means for displacing the readout area within the scanning field in at least one of a horizontal scanning direction and a vertical scanning direction at a predetermined speed.

3. The multi-vision screen display device of claim 1, wherein the display control means is further comprised of a readout area replacing means for dividing the scanning field into a plurality of subfields and replacing the subfield with another at a lapse of time, thereby the readout area is selected on the replacing subfield.

4. A multi-vision screen display device having a same number of processing units as subscreens of a display screen, the processing units processing to display an input image on a display area which is the subscreen assigned to each processing unit, wherein each input image is output from a different one of a plurality of image sensing means, each processing unit comprising:

an image memory;

a display magnification selecting means for selecting a read-out area of the input image to be displayed on the display area;

a writing means for writing an image signal within the selected read-out area into the image memory at a pixel density which corresponds to a display magnification; and a reading means for reading the image signal from the image memory at a timing which realizes to display the read-out area of the input image on the display area, wherein the writing means comprises:

a coordinate detecting means for detecting coordinates of the image signal within a scanning field at each moment;

a judging means for judging if the detected coordinates places within the read-out area of the input image;

a clock frequency changing means for changing a frequency of a sampling clock in accordance with the display magnification;

a sampling means for sampling the image signal at the frequency of the sampling clock;

a horizontal address designating means for designating a horizontal address where the image signal is written in;

a vertical address designating means for designating a vertical address where the image signal is written in; and a write controlling means for writing the image signal sampled by the sampling means into a write-in area of the image memory designated by the horizontal address and the vertical address when the judging means judges that the coordinates of the image signal place within the read-out area of the input image.

5. The multi-vision screen display device of claim 4, wherein the sampling means is an A/D converter.

6. The multi-screen display device to claim 4, further comprising means for generating a pixel clock based on the inputted image signal,
wherein the clock frequency changing means is made up of a switch and at least one divider, and is capable of switching the display magnification between at least two kinds of display which are namely zoom-up magnification display and one-time magnification display,
wherein during zoom-up magnification display, the switch selects the pixel clock as the sampling clock,
and wherein during one-time magnification display, the switch selects a clock obtained by having the pixel clock divided by the divider as the sampling clock.

7. The multi-vision screen display device of claim 6, wherein the horizontal address designating means is a first counter which counts the sampling clock while the vertical address designating means is a second counter which counts a horizontal synchronous signal included in the image signal, in which the first counter is reset when a horizontal component of the coordinates represents a right end of the read-out area while the second counter is reset when a vertical component of the coordinates indicates a top end of the read-out area, the coordinates being detected by the coordinate detecting means.

8. The multi-vision screen display device of claim 7, wherein the coordinate detecting means is comprised of an X coordinate counter and a Y coordinate counter, the X coordinate counter counting the pixel clock until the coordinate detecting means is reset by the horizontal synchronous signal included in the image signal while the Y coordinate counter counting the horizontal synchronous signal until the coordinate detecting means is reset by the vertical synchronous signal.

9. The multi-vision screen display device of claim 8, wherein the display magnification selecting means is comprised of an output circuit for outputting coordinates of an upper left corner and a bottom right corner of the read-out area represented by the counting number of the X coordinate counter and the counting number of the Y coordinate counter.

10. The multi-vision screen display device of claim 9, wherein the judging means is a comparator which compares the counting number of the X coordinate counter and the counting number of the Y coordinator with the coordinates from the output circuit.

11. The multi-vision screen device of claim 9, wherein the output circuit comprises an X start register and a Y start register for holding the X coordinate of the start point and the Y coordinate of the start point respectively, the start point indicating the upper: left corner of the read-out area, while an X end register and a Y end register for holding the X coordinate of the end point and the Y coordinate of the end point respectively, the end point indicating the bottom right corner of the read-out area.

12. The multi-vision screen display device of claim 11, further comprising a read-out area horizontal displacing means for updating the X coordinates in the X start register and the X end register, wherein the read-out area horizontal displacing means keeps a same difference between the X coordinates in the X start register and the X end register.

13. The multi-vision screen display device of claim 12, wherein the read-out area horizontal displacing means is comprised of a read-out area positive displacement controlling unit for updating the X coordinates in the X start register and the X end register by increasing the X coordinates at a fixed speed;
a first comparator for comparing the updated X coordinate in the X end register with the right end coordinate of read-out area of the input image at said increase of the X coordinates;
a read-out area negative displacement controlling unit for updating the X coordinates in the X start register and the X end register by decreasing the X coordinates at a fixed speed; and
a second comparator for comparing the updated X coordinate in the X start register with the left end coordinate of the read-out area of the input image at said decrease of the X coordinates, wherein
the read-out area horizontal displacing means starts operating the read-out area positive displacement controller when the X coordinate in the X start register coincides with the left end coordinate of the read-out area.

14. The multi-vision screen display device of claim 11, further comprising a read-out area vertical displacing means for updating the Y coordinates in the Y start register and the Y end register, wherein the read-out area vertical displacing means keeps a same difference between the Y coordinates in the Y start register and the Y end register.

15. The multi-vision screen display device of claim 12, wherein the read-out area vertical displacing means is comprised of a read-out area positive displacement controlling unit for updating the Y coordinates in the Y start register and the Y end register by increasing the Y coordinates at a fixed speed;
a first comparator for comparing the updated Y coordinate in the Y end register with the top end coordinate of the read-out area of the input image at said increase of the Y coordinates;
a read-out area negative displacement controlling unit for updating the Y coordinates in the Y start register and the Y end register by decreasing the X coordinates at a fixed speed; and
a second comparator for comparing the updated Y coordinate in the Y start register with the bottom end coordinate of the read-out area at said decrease of the Y coordinates, wherein
the read-out area vertical displacing means starts operating the read-out area positive displacement controlling unit when the Y coordinate in the Y start register coincides with the bottom end coordinate of the read-out area.

16. The multi-vision screen display device of claim 11, wherein the input image is shot by a monitoring camera and a screen of the monitoring camera is divided into a plurality of, areas, and the output circuit includes a circuit for replacing the coordinates of the start point and the end point of the read-out area on one area, the coordinates held in the X start register, the Y start register, the X end register, and the Y end register, with the coordinates of the start and the end points of the read-out are on another area.

17. A multi-vision screen display device having a same number of processing units as subscreens of a display screen, the processing units processing to display an input image on a display area which is the subscreen assigned to each processing unit, wherein each input image is output from a different one of a plurality of image sensing means, each processing unit comprising:

an image memory;

a display magnification selecting means for selecting a read-out area of the input image to be displayed on the display area;

a writing means for writing an image signal within the selected read-out area into the image memory at a pixel density which corresponds to a display magnification; and a reading means for reading the image signal from the image memory at a timing which realizes to display the read-out area of the input image on the display area, said multi-vision screen display device further including an image sensor for computing a sum of a luminance signal of a pixel placing within a fixed range of the read-out area, and generating an alarm signal when a difference between the sum at a last scanning field and the sum at a current scanning field is larger than a predetermined threshold value.

18. The multi-vision screen display device of claim 17, wherein the image sensor is comprised of an adding means for adding the luminance signal of every pixel within the fixed range of the read-out area at the current scanning field;

a holding means for holding said addition result for the sum at the last scanning field;

a difference computing means for computing the difference between the addition result held in the holding means and the addition result from the adding means; and an alarm signal output circuit for comparing the difference from the difference computing means with the threshold value, then outputting the alarm signal when the difference is larger than the threshold value.

19. The multi-vision screen display device of claim 18, further comprising:

a zoom-out display selection controlling means for selecting the zoom-out display upon receipt of the alarm signal from the image sensor;

a writing means for writing an image signal within the selected read-out area into the image memory at a pixel density which corresponds to a display magnification; and a reading means for reading the image signal from the image memory at a timing which realizes to display the read-out area of the input image on the display area.

20. A multi-vision screen display device which processes an input image from a plurality of monitoring cameras by a same number of processing units as the monitoring cameras and displays each input image on a different subscreen of a multi-vision screen simultaneously, each processing unit comprising:

an image memory; and a display magnification selection means for selecting a read-out area within a scanning area of a screen at the monitoring camera, the read-out area to be displayed on a display area being the subscreen assigned to the processing unit;

a writing means for writing an image signal within the read-out area into the image memory at a pixel density which corresponds to a display magnification; and a reading means for reading the image signal from the image memory at a timing which realizes to display the read-out area of the input image on the display area, said multi-vision screen display device further comprising:

a connection switching means placed between the monitoring camera and each processing unit for replacing a connection between the monitoring camera and the processing unit with another; and a read-out area replacing means for replacing the read-out area by another and a connection switching means for replacing a connection between the monitoring camera and the processing unit by another, wherein the read-out area is determined in accordance with the connection switching means which determines the number of the processing units where the monitoring camera provides the input image.

21. The multi-vision screen display device of claim 20, wherein the writing means comprises:

a coordinate detecting means for detecting coordinates of the image signal within a scanning field at each moment;

a judging means for judging if the detected coordinates are placed within the read-out area of the input image;

a clock frequency changing means for changing a frequency of a sampling clock in accordance with the display magnification;

a sampling means for sampling the image signal at the frequency of the sampling clock;

a horizontal address designating means for designating a horizontal address wherein the image signal is written in;

a vertical address designating means for designating a vertical address where the image signal is written in; and a write controlling means for writing the image signal sampled by the sampling means into a write-in area of the image memory designated by the horizontal address and the vertical address when the judging means judges that the coordinates of the image signal are placed within the read-out area of the input image.

22. A multi-vision screen display device comprising:

a plurality of image processing units;

an input image distributing means for distributing input images to the plurality of image processing units;

a display for displaying on a display screen a plurality of images respectively output from the plurality of image processing units, the display screen being divided into a plurality of display areas which respectively correspond to the plurality of image processing units; and a magnification receiving means for receiving magnifications which each are separately specified for one of the plurality of images respectively output from the plurality of image processing units, wherein each image processing unit includes:

an image memory;

a writing means for writing an input image distributed by the input image distributing means into the image memory with a magnification received by the magnification receiving means and being specified for the present image processing unit, a write size restricting means for restricting a size of an area in the image memory, into which the input image is written, to a size of a display area assigned to the present image processing unit; and a reading means for reading the input image from the image memory with a timing when the input image is displayed on the display area assigned to the present image processing unit.

23. The multi-vision screen display device of claim 22, wherein the write size restricting means includes:

a write start register for storing a write start coordinate of the area in the image memory into which the input image is written; and a write end register for storing a write end coordinate of the area in the image memory into which the input image is written, wherein
the writing means includes:
- a synchronous separation unit for extracting a horizontal synchronous signal and a vertical synchronous signal from the input image distributed by the input image distributing means and for generating a pixel clock;
- a clock pulse generating unit for generating a clock pulse using the pixel clock generated by the synchronous separation unit, the clock pulse corresponding to the magnification specified for the present image processing unit received by the magnification receiving means;
- an A/D converting unit for sampling sample signals from the input image distributed by the input image distributing means using the clock pulse generated by the clock pulse generating unit and converting the sampled sample signals to digital image signals;
- a scanning position coordinate generating unit for generating a coordinate indicating a scanning position of the input signal for each scanning time, using the pixel clock, the horizontal synchronous signal, and the vertical synchronous signal;
- a write enabling unit for enabling the writing means to write the input image into the image memory when the coordinate generated by the scanning position coordinate generating unit is in a range from the write start coordinate to the write end coordinate; and
- a write address generating unit for generating a write address by counting each clock pulse generated by the clock pulse generating unit, wherein
  the digital image signals output from the AID converting unit are written into a location indicated by the write address generated by the write address generating unit.

24. The multi-vision screen display device of claim 23, wherein the reading means includes:
- a display area coordinate storing unit for storing a start coordinate and an end coordinate of the display area assigned to the present image processing unit;
- a display address generating unit for generating a display address using the pixel clock, the horizontal synchronous signal, and the vertical synchronous signal of the input image distributed to the present image processing unit;
- a read enabling unit for enabling the reading means to read the input image from the image memory when the display coordinate is in a range from the start coordinate to the end coordinate of the display area assigned to the present image processing unit; and
- a read address generating unit for generating a read address synchronizing with a clock which is equivalent to the pixel clock multiplied by an integer when the read enabling unit enables the reading means to read the input image and for supplying the generated read address to the image memory; and
- a D/A converting unit for converting digital image signals read from the image memory to analog image signals and outputting the converted analog image signals.

* * * * *